(12) United States Patent
Bilbao et al.

(10) Patent No.: US 9,382,361 B2
(45) Date of Patent: Jul. 5, 2016

(54) PROCESS TO PRODUCE ETHYLENE PROPYLENE COPOLYMERS

(71) Applicants: Daniel Bilbao, Houston, TX (US); Jeffrey L. Brinen, League City, TX (US); Carlos U. De Gracia, La Porte, TX (US); Henry Dong, Stafford, TX (US)

(72) Inventors: Daniel Bilbao, Houston, TX (US); Jeffrey L. Brinen, League City, TX (US); Carlos U. De Gracia, La Porte, TX (US); Henry Dong, Stafford, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/640,871

(22) Filed: Mar. 6, 2015

(65) Prior Publication Data

US 2015/0307641 A1    Oct. 29, 2015

Related U.S. Application Data

(60) Provisional application No. 61/968,575, filed on Mar. 21, 2014.

(51) Int. Cl.
| | | |
|---|---|---|
| C08F 210/18 | (2006.01) | |
| C08F 4/643 | (2006.01) | |
| C08F 4/653 | (2006.01) | |
| C08F 4/6592 | (2006.01) | |
| C08F 4/659 | (2006.01) | |

(52) U.S. Cl.
CPC ............ *C08F 210/18* (2013.01); *C08F 4/6592* (2013.01); *C08F 4/65904* (2013.01); *C08F 4/65908* (2013.01)

(58) Field of Classification Search
CPC .. C08F 210/16; C08F 4/65908; C08F 210/18; C08F 4/65904
See application file for complete search history.

(56) References Cited

U.S. PATENT DOCUMENTS

| | | | |
|---|---|---|---|
| 3,674,754 | A | 7/1972 | Cameli et al. |
| 4,510,303 | A | 4/1985 | Oda et al. |
| 5,698,651 | A | 12/1997 | Kawasaki et al. |
| 5,798,427 | A | 8/1998 | Foster et al. |
| 5,902,867 | A | 5/1999 | Muskens et al. |
| 5,948,873 | A | 9/1999 | Santi et al. |
| 5,977,251 | A | 11/1999 | Kao et al. |
| 6,034,022 | A | 3/2000 | McAdon et al. |
| 6,255,427 | B1 | 7/2001 | Exner et al. |
| 6,294,631 | B1 | 9/2001 | Brant |
| 6,348,555 | B1 | 2/2002 | Lai et al. |
| 6,410,650 | B1 | 6/2002 | Koda et al. |
| 6,420,507 | B1 | 7/2002 | Kale et al. |
| 6,506,857 | B2 | 1/2003 | Rix |
| 6,545,088 | B1 | 4/2003 | Kolthammer et al. |
| 6,657,027 | B2 | 12/2003 | Ostoja-Starzewski et al. |
| 6,680,361 | B1 | 1/2004 | Cady et al. |
| 6,686,419 | B2 | 2/2004 | Wouters et al. |
| 6,723,794 | B2 | 4/2004 | Kawasaki et al. |
| 6,875,816 | B2 | 4/2005 | DeGroot et al. |
| 6,924,342 | B2 | 8/2005 | Stevens et al. |
| 7,135,533 | B2 | 11/2006 | Ravishankar |
| 7,148,305 | B2 | 12/2006 | Stevens et al. |
| 7,169,865 | B2 | 1/2007 | Ostoja Starzewski et al. |
| 7,271,221 | B2 | 9/2007 | Stevens et al. |
| 7,300,983 | B2 | 11/2007 | Degroot et al. |
| 7,829,645 | B2 | 11/2010 | Windmuller et al. |
| 7,956,140 | B2 | 6/2011 | Ijpeij et al. |
| 7,989,565 | B2 | 8/2011 | Gibson et al. |
| 8,013,082 | B2 | 9/2011 | Ramage et al. |

(Continued)

FOREIGN PATENT DOCUMENTS

| | | |
|---|---|---|
| BR | 2005/001339 | 12/2006 |
| EP | 708 117 | 4/1996 |
| EP | 751 156 | 1/1997 |
| EP | 784 062 | 7/1997 |
| EP | 2 221 323 | 8/2010 |

(Continued)

OTHER PUBLICATIONS

Christman et al., "Reactivities of Nonconjugated Dienes Used in Preparation of Terpolymers in Homogeneous Systems," Macromolecules, 1968, vol. 1(4), pp. 358-363.

(Continued)

*Primary Examiner* — Caixia Lu
(74) *Attorney, Agent, or Firm* — Catherine L. Bell

(57) ABSTRACT

This invention relates to a copolymer prepared using two or more non-coordinating anion activators comprising a first C2 to C12 alpha olefin (such as ethylene), a second C3 to C12 alpha olefin (such as propylene) different from the first alpha olefin, and diene (such as ethylidene norbornene and/or vinyl norbornene), where the polymer has: a) first alpha olefin (ethylene) content of 35 to 90 mol %; b) second alpha olefin (propylene) content of 9.8 to 64.8 mol %; c) diene content of 0.2 to 5 mol %; d) a branching index g'ave of 0.95 or more; e) a complex viscosity ratio (eta*(0.01 rad/s)/eta*(100 rad/s), at 125° C.) greater than $1.1*Y_0$, where $Y_0=Y_1+\{[(Y_2-Y_1)/(X_2-X_1)](X_0-X_1)\}$, where $X_0$ is the wt % of a first non-coordinating anion activator, $NCA_1$, used to prepare the copolymer (based upon weight of $NCA_1$ and a second non-coordinating anion activator, $NCA_2$, used to prepare the copolymer), $X_1=0$, $X_2=100$, $Y_1$=complex viscosity ratio of polymer made with 100% $NCA_1$ and 0% $NCA_2$, $Y_2$ is complex viscosity ratio of polymer made with 100% $NCA_2$ and 0% $NCA_1$, where $NCA_1$ has an Mw lower than the Mw of $NCA_2$; f) an Mw/Mn of 4.0 or less; g) a melting point of 30° C. or less; and h) a Composition Distribution Breadth Index of 50% or more.

9 Claims, 6 Drawing Sheets

(56) References Cited

U.S. PATENT DOCUMENTS

| | | |
|---|---|---|
| 8,058,373 B2 | 11/2011 | Stevens et al. |
| 8,101,696 B2 | 1/2012 | Konze et al. |
| 2004/0132935 A1 | 7/2004 | Arjunan et al. |
| 2004/0220359 A1 | 11/2004 | Abhari et al. |
| 2009/0209672 A1 | 8/2009 | Ebata et al. |
| 2011/0065877 A1 | 3/2011 | Yim et al. |
| 2012/0149856 A1 | 6/2012 | Wang et al. |
| 2012/0316302 A1 | 12/2012 | Stewart |
| 2013/0324691 A1 | 12/2013 | Nozue |

FOREIGN PATENT DOCUMENTS

| | | |
|---|---|---|
| JP | 2000/256423 | 9/2000 |
| KR | 2011/059405 | 6/2011 |
| WO | 97/32946 | 9/1997 |
| WO | 98/06728 | 2/1998 |
| WO | 98/49212 | 11/1998 |
| WO | 00/59962 | 10/2000 |
| WO | 01/85839 | 11/2001 |
| WO | WO 2008/095687 | 8/2008 |
| WO | 2010/012587 | 2/2010 |
| WO | 2011/002199 | 1/2011 |
| WO | 2012/130922 | 10/2012 |

OTHER PUBLICATIONS

Garcia-Franco et al., "similarities between Gelation and Long Chain Branching Viscoelastic Behavior," Macromolecules, 2001, vol. 34(10), pp. 3115-3117.

Crosby et al., "Characterization of long chain branching: Dilution rheology of industrial polyethylenes," Journal of Rheology, 2002, vol. 46(2), pp. 401-426.

Phoowakeereewiwat et al., "Investigation of diene addition on ethylene-propylene (EP) copolymerization with a zirconocene catalyst: Effects of diene types and E/P ratios," Journal of Materials Processing Technology, 2009, vol. 209, p. 520-524.

PROCESS TO PRODUCE ETHYLENE PROPYLENE COPOLYMERS

CROSS-REFERENCE TO RELATED APPLICATION

This invention claims priority to, and the benefit of, U.S. Ser. No. 61/968,575, filed Mar. 21, 2014, which is herein incorporated by reference.

FIELD OF THE INVENTION

This invention relates to novel ethylene propylene diene monomer copolymers and processes to make such copolymers.

BACKGROUND OF THE INVENTION

Ethylene/α-olefin rubbers, such as an ethylene/propylene copolymer rubber (EPR) and an ethylene/propylene/diene monomer copolymer rubber (EPDM), typically have no unsaturated bond in the main chain of their molecular structures. EPR and EPDM are thus excellent in heat aging resistance, weathering resistance and ozone resistance as compared with general-purpose conjugated diene rubbers, and they have been broadly used for automobile parts, electric wire materials, electric/electronic parts, building and civil engineering materials, or industrial material parts.

In recent years, the need for lightening and lengthening of life of various parts has increased, thus higher performance properties have been strongly desired. Moreover, quality control standards for many molded or extruded products are becoming more stringent giving rise to more demanding material design to remove production and extrusion problems.

In EPDM prepared by the use of a conventional Ziegler Natta catalyst, there is a fear that the residual metal component derived from the catalyst causes deterioration of heat resistance, occurrence of foreign matter, or inhibition of vulcanization reaction. Further, there is a problem of difficulty in control of molecular structure of the copolymer because the catalytic activity during copolymerization is low.

In order to enhance production processability and extrusion processability of EPDM, it is desirable for the polymer viscosity to be moderately low. However, if the viscosity of the polymer is too low, sealing properties and strength of the resulting crosslinked rubber article are negatively impacted making the crosslinked rubber article less useful. Widening molecular weight distribution and/or composition distribution to decrease the viscosity of the polymer is practiced, but there often occurs problems that the low-molecular weight material causes fogging of window glass in automobiles or rooms, tackiness on the article surface, and brittleness at low temperatures.

One method to improve retention of shape in the extrusion of EPDM is to increase the viscosity of the rubber compound, but if the viscosity is increased, the extrusion rate is typically reduced, resulting in a problem of poor surface texture of the extrudate, among other things.

WO 2000/59962 tried to improve sealing properties and strength of a vulcanized rubber article obtained from EPDM with maintaining kneading processability and extrusion processability; however, the results were not satisfactory from the viewpoint of a balance between processabilities and sealing properties or strength.

U.S. Pat. No. 6,686,419 discloses multimodal ethylene/alpha-olefin/diene polymers and processes for making such using multiple reactors in series or parallel. Specifically Examples 1-8 disclose polymerizations of ethylene/propylene/ethylidene norbornene using bis(p-triethylsilyl-phenyl)methylene(cyclopentadienyl)(2,7-di-tert-butyl-9-fluorenyl) hafnium dimethyl combined with N,N-dimethylanilinium (tetrakis pentaflourophenyl borate). According to column 13, line 23, et seq. property control of the first and second fractions was achieved by adjusting the hydrogen to each reactor, as well as varying the monomer and catalyst feed rates.

U.S. Pat. No. 6,506,857 discloses Group 4 organometallic compounds comprising two ancillary monanionic ligands, each of which independently may be substituted or unsubstituted, wherein the ligands are bonded by a covalent bridge containing a substituted single Group 14 atom, the substitution on said Group 14 atom comprising aryl groups at least one of which contains at least one hydrocarbylsilyl substituent group, such as bis(p-trimethylsilyl-phenyl)methylene(cyclopentadienyl)(2,7-di-tert-butyl-9-fluorenyl) hafnium dimethyl.

U.S. Pat. No. 6,255,427 discloses catalyst combined with a first cocatalyst of alumoxane and a second cocatalyst of perfluoroarylboranes.

US 2012/0316302 discloses catalyst systems comprising multiple non-coordinating anion activators and methods for production of crystalline polymers therewith.

Others have mentioned use of alumoxane or scavenger or aluminum alkyl and non-coordinating anion activators for production of polymers such as EPDM or EPR, such as U.S. Pat. No. 6,034,022, U.S. Pat. No. 6,420,507, U.S. Pat. No. 5,948,873, WO 2012/130922, and EP 0 708 117.

Another method of increasing processability is to produce bimodal elastomers having a major fraction of lower molecular weight polymer (Mooney viscosity less than about 100) and a minor fraction of high molecular weight polymer (Mooney viscosity greater than 120), as in ExxonMobil Chemical's Vistalon™ Bimodal EPDM grades. However, these polymers tend to have an elasticity which is lower than desired for some applications. There is still a need in the art for new and improved methods of producing processable EPDM polymers having good elasticity, preferably in a tunable continuous process.

Other referenced of interest include: U.S. Pat. No. 5,698,651; EP 2 115 018; U.S. Pat. No. 7,829,645; U.S. Pat. No. 7,956,140; EP 0 751 156; U.S. Pat. No. 8,058,373; U.S. Pat. No. 8,101,696; U.S. Pat. No. 8,013,082; WO 1997/032946; WO 2011/002199; KR 2011/059405; US 2011/065877; WO 2010/012587; U.S. Pat. No. 7,989,565; U.S. Pat. No. 3,674,754; U.S. Pat. No. 4,510,303; US 2004/0220359; WO 1998/49212; US 2009/0209672; BR 2005/001339; U.S. Pat. No. 7,148,305; U.S. Pat. No. 6,924,342; U.S. Pat. No. 6,657,027; U.S. Pat. No. 7,169,865; U.S. Pat. No. 7,300,983; U.S. Pat. No. 7,271,221; U.S. Pat. No. 6,875,816; JP 2000/256423; U.S. Pat. No. 6,410,650; U.S. Pat. No. 6,420,507; U.S. Pat. No. 6,680,361; WO 1998/006728; U.S. Pat. No. 5,977,251; EP 784 062; U.S. Pat. No. 6,723,794; U.S. Pat. No. 5,798,427; U.S. Pat. No. 5,902,867; U.S. Pat. No. 6,348,555; EP 2 221 323; U.S. Pat. No. 7,135,533; and WO 2001/85839.

See also, Macromolecules, 1968, 1, 358; Macromolecules, 2001, 34, 3115; J Rheology, 2002, 46, 401; and J. Matls Proc Tech 2009, 209, 520.

There is still a need in the art for new and improved methods of producing processable EPDM polymers having good elasticity, preferably in a tunable continuous process.

SUMMARY OF THE INVENTION

This invention relates to a method to polymerize olefins comprising contacting a catalyst compound with at least two non-coordinating anion activators (NCA's), a first C2 to C12 alpha olefin (preferably ethylene), a second C3 to C12 alpha olefin (preferably propylene) different from the first alpha olefin, and one or more dienes (such as ethylidene norbornene and/or vinyl norbornene) to obtain a terpolymer, (preferably EPDM) as described below, where the catalyst compound is combined with the activators prior to introduction into the polymerization reaction.

This invention relates to a copolymer prepared from two or more non-coordinating anion activators comprising a first C2 to C12 alpha olefin (such as ethylene), a second C3 to C12 alpha olefin (such as propylene) different from the first alpha olefin, and diene (such as ethylidene norbornene and/or vinyl norbornene), where the copolymer has:
a) first alpha olefin (ethylene) content of 35 to 90 mol %;
b) second alpha olefin (propylene) content of 9.8 to 64.8 mol %;
c) diene content of 0.2 to 5 mol %;
d) a branching index g'ave of 0.95 or more;
e) a complex viscosity ratio (eta*(0.01 rad/s)/eta*(100 rad/s), at 125° C.) greater than $1.1 \cdot Y_0$, where $Y_0 = Y_1 + \{[Y_2 - Y_1]/(X_2 - X_1)](X_0 - X_1)\}$, where $X_0$ is the wt % of a first non-coordinating anion activator, $NCA_1$, used to prepare the copolymer (based upon weight of $NCA_1$ and a second non-coordinating anion activator, $NCA_2$, used to prepare the copolymer), $X_1 = 0$, $X_2 = 100$, $Y_1$ = complex viscosity ratio of polymer made with 100% $NCA_1$ and 0% $NCA_2$, $Y_2$ is complex viscosity ratio of polymer made with 100% $NCA_2$ and 0% $NCA_1$, where $NCA_1$ has an Mw lower than the Mw of $NCA_2$;
f) an Mw/Mn of 4.0 or less, alternately, 5.0 or less;
g) a melting point of 30° C. or less; and
h) a Composition Distribution Breadth Index of 50% or more.

Figure 1:
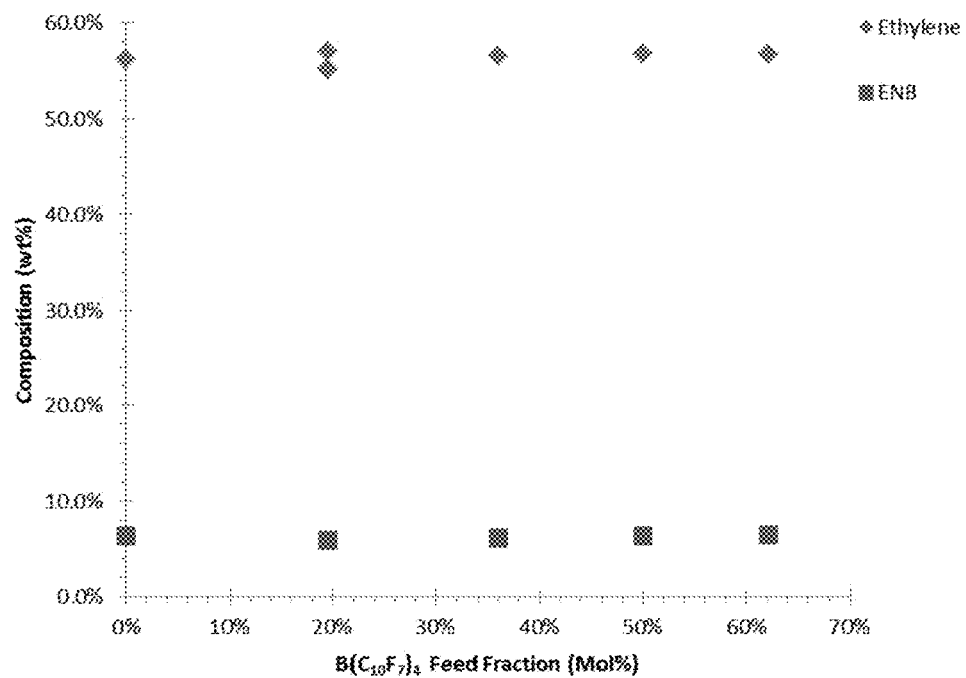
FIG. 1 is a graph of polymer composition across a range of activator feed fractions.
Figure 2:
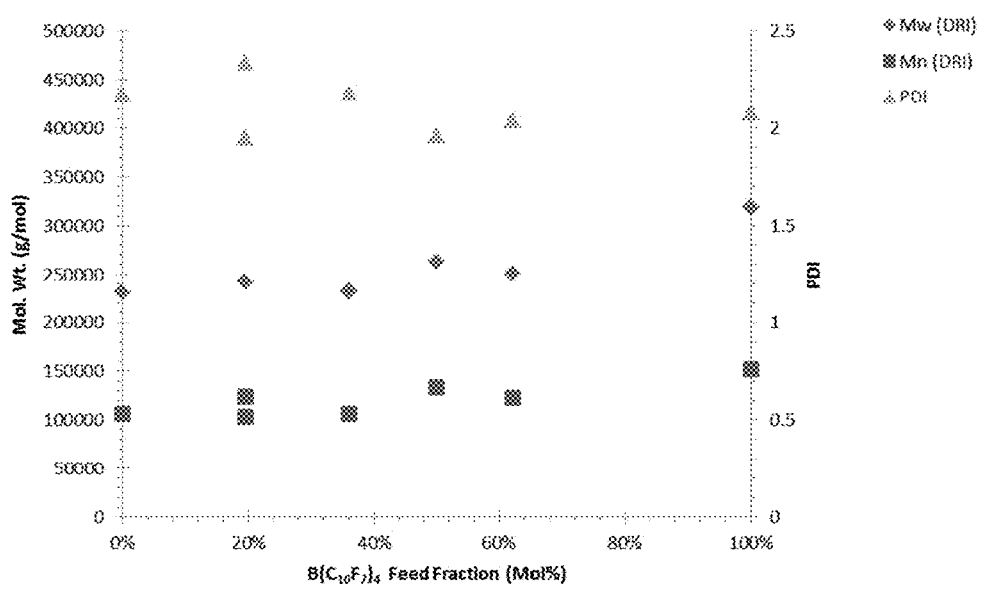
FIG. 2 is a graph of polymer Mw and PDI (Mw/Mn) determined by GPC-DRI across a range of activator feed fractions.
Figure 3:
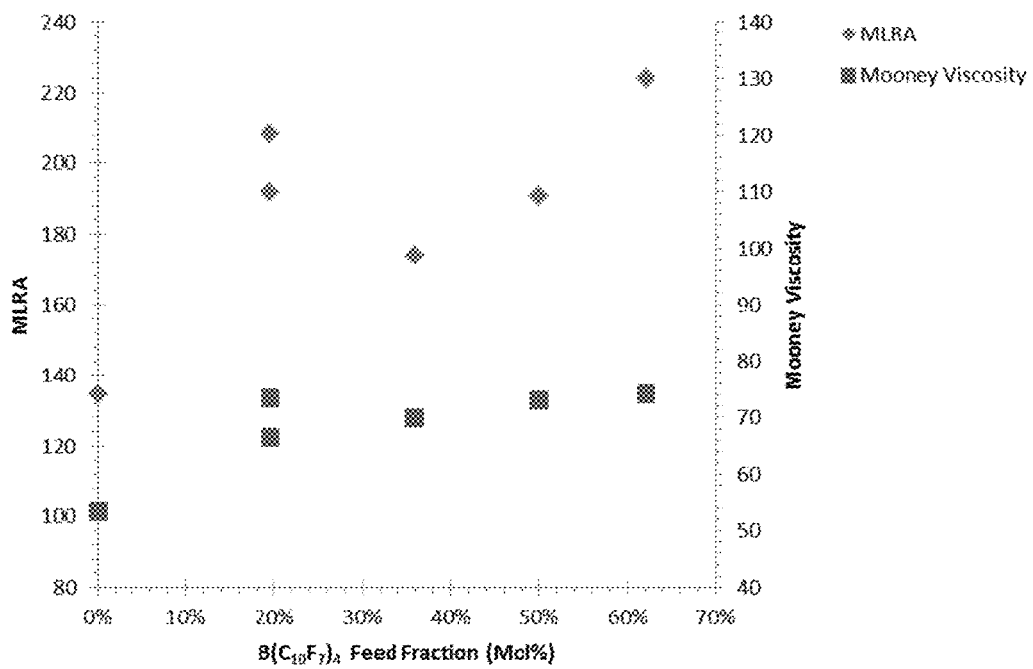
FIG. 3 is a graph of polymer Mooney viscosity and MLRA response for various mol fractions $B(C_{10}F_7)_4$ in the feed.

For the purposes of this invention and the claims thereto, the new numbering scheme for the Periodic Table Groups is used as described in CHEMICAL AND ENGINEERING NEWS, 63(5), pg. 27 (1985). Therefore, a "Group 4 metal" is an element from Group 4 of the Periodic Table.

Unless otherwise indicated "catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Unless otherwise indicated "conversion" is the amount of monomer that is converted to polymer product, and is reported as mol % and is calculated based on the polymer yield and the amount of monomer fed into the reactor. Unless otherwise indicated "catalyst activity" is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less). An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

The term "different" as used to refer to alpha-olefins indicates that the alpha-olefins differ from each other by at least one atom or are different isomerically.

The term "different" as used to refer to non-coordinating anion activators indicates that the NCA's differ from each other by at least one atom or are different isomerically.

For the purposes of this invention, ethylene shall be considered an α-olefin.

For purposes of this invention and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group and ethyl alcohol is an ethyl group substituted with an —OH group.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are reported in g/mol. The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane, NCA is non-coordinating anion, MLRA is Mooney large relaxation area, and ENB is 5-ethylidene-2-norbornene.

A "catalyst system" is a combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer.

In the description herein, the metallocene catalyst may be described as a catalyst precursor, a pre-catalyst compound, metallocene catalyst compound or a transition metal compound, and these terms are used interchangeably. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of this invention and claims thereto in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

Polymer (EPDM) Products

This invention relates to a copolymer prepared using two or more NCA's, said copolymer comprising a first C2 to C12 alpha olefin (preferably ethylene), a second C3 to C12 alpha olefin (preferably propylene) different from the first alpha olefin, and diene (such as ethylidene norbornene and/or vinyl norbornene), where the polymer has:

a) a first alpha olefin (ethylene) content of 35 to 90 mol % (preferably 40 to 80 mol %, preferably 50 to 75 mol %);
b) a second alpha olefin (propylene) content of 9.8 to 64.8 mol % (preferably 19.8 to 59.8 mol %, preferably 24.8 to 49.8 mol %);
c) a diene content of 0.2 to 5 mol % (preferably 0.3 to 3.0 mol %, preferably 0.5 to 2.5 mol %);
d) a branching index g'ave of 0.95 or more (preferably 0.97 or more, preferably 0.99 or more);
e) a ratio of complex viscosity (eta*(0.01 r/s)/eta*(100 rad/s), measured at 125° C.) greater than $1.1*Y_0$, where $Y_0=Y_1+\{[(Y_2-Y_1)/(X_2-X_1)](X_0-X_1)\}$, where $X_0$ is the wt % of $NCA_1$ used to prepare the copolymer (based upon weight of $NCA_1$ and $NCA_2$), $X_1=0$, $X_2=100$, $Y_1$=complex viscosity ratio of copolymer made with 100% $NCA_1$ and 0% $NCA_2$, $Y_2$ is complex viscosity ratio of copolymer made with 100% $NCA_2$ and 0% $NCA_1$, $NCA_1$ is a first NCA, where $NCA_1$ has an Mw lower than the Mw of $NCA_2$, and $NCA_2$ is a second NCA different from $NCA_1$;
f) an Mw/Mn of 5.0 or less (preferably 4.0 or less, preferably 3.5 or less, preferably more than 1 to 3.0, preferably 1.1 to 3.0);
g) a melting point of 30° C. or less (preferably 20° C. or less, preferably 0° C. or less, preferably −10° C. or less, preferably −15° C. or less); and
h) a Composition Distribution Breadth Index of 50% or more (preferably 60% or more, preferably 70% or more).

In a preferred embodiment of the invention, any copolymer produced herein may have:
e) a Mooney large relaxation area of 170 MU*sec or more (preferably 180 MU*sec or more, preferably 180 to 280 MU*sec, preferably 185 to 250 MU*sec, preferably 190 to 230 MU*sec); and/or
f) a Mooney Viscosity ((1+4) at 125° C.) of 60 to 80 MU (preferably 65 to 75 MU, preferably 70 to 75 MU).

In a preferred embodiment of the invention, the copolymer produced herein has a Mooney large relaxation area of 170 MU*sec or more (preferably 180 MU*sec or more, preferably 180 to 280 MU*sec, preferably 185 to 250 MU*sec, preferably 190 to 230 MU*sec); and a Mooney Viscosity ((1+4) at 125° C.) of 60 to 80 MU (preferably 65 to 75 MU, preferably 70 to 75 MU).

Useful polymer compositions of this invention comprise units derived from ethylene, alpha-olefin and diene, often referred to as EODM polymers (or when the alpha-olefin is propylene) are often referred to as "EPDM" polymers. The alpha olefin is preferably one or more $C_3$ to $C_8$ alpha olefins, more preferably propylene or butene, preferably propylene. The diene is preferably a non-conjugated diene selected from the group consisting of 5-ethylidene-2-norbornene (ENB), 1,4-hexadiene, 1,6 octadiene, 5-methyl-1,4-hexadiene, 3,7-dimethyl-1,6-octadiene, dicyclopentadiene (DCPD), norbornadiene, 5-vinyl-2-norbornene (VNB), and combinations thereof, most preferably ENB.

In a preferred embodiment, the maximum amount of ethylene derived units is 90 mole percent (corresponding to 85 wt % in EPDM), more preferably 80 mole percent and most preferably 75 mole percent based on the total moles of monomer. The preferred minimum amount of ethylene derived units is 35 mole percent, more preferably 40 mole percent, even more preferably 50 mole percent based on the total moles of monomer. The diene content maximum is preferably 5.0 mole percent (15 wt %), more preferably 3.0 mole percent even more preferably 2.5 mole percent, with the preferred minimum being 0.2 mole percent (0.7 wt %), more preferably 0.3 mole percent, and even more preferably 0.5 mole percent. The balance of the polymer units is preferably made up of alpha olefin (preferably propylene) typically present at from 9.8 to 64.8 mol %, preferably 19.8 to 59.8, preferably 24.8 to 49.8 mol %.

Ethylene content is determined by FTIR, ASTM D3900. ENB content is determined by FTIR, ASTM D6047. Other dienes can be measured via $^1$H NMR. Unless otherwise indicated, $^1$H NMR data is collected on a Bruker AVANCE III 400 MHz spectrometer running Topspin™ 3.0 software at room temperature (approximately 23° C.). Tetrachloroethane-$d_2$ is used as a solvent (chemical shift of 5.98 ppm is used as a reference) for all materials.

In a preferred embodiment of the invention, the polymer compositions of this invention have a Mooney viscosity of at least 60 MU, preferably at least 65 MU, even more preferably at least 70 MU, with preferred maximum Mooney viscosity being 80 MU, and even more preferably 75 MU. Unless otherwise indicated, Mooney viscosity is measured as ML (1+4) at 125° C. in Mooney units according to ASTM D-1646. However, Mooney viscosity values greater than about 100 cannot generally be measured under these conditions. In this event, a higher temperature is used (i.e., 150° C.), with eventual longer shearing time (i.e., 1+8 @ 150° C.), but more preferably, the Mooney measurement is carried out using a non-standard small rotor as described in U.S. Pat. No. 6,686,419 at column 6, line 59 et seq. and the references cited therein.

The non-standard rotor design is employed with a change in Mooney scale that allows the same instrumentation on the Mooney machine to be used with higher Mooney polymers. This rotor is termed MST—Mooney Small Thin. One MST point is approximately 5 ML points when MST is measured at (5+4 @ 200° C.) and ML is measured at (1+4 @ 125° C.). ASTM D1646 prescribes the dimensions of the rotor to be used within the cavity of the Mooney machine. This prescription allows a large and a small rotor differing only in diameter. These are referred to as ML (Mooney Large) and MS (Mooney Small). However, EPDM can be produced at such high MW that the torque limit of the Mooney machine can be exceeded using these standard prescribed rotors. In these instances, the test is run as described in U.S. Pat. No. 6,686,419 column 6, line 59 et seq. and the references cited therein.

In a preferred embodiment of the invention the polymer produced herein has a multimodal molecular weight distribution (Mw/Mn, MWD) as determined by Gel Permeation Chromatography (GPC-DRI). By "multimodal" is meant that the GPC trace has at least two peaks or inflection points. An inflection point is that point where the second derivative of the curve changes in sign (e.g., from negative to positive or vice versus). In another preferred embodiment of the invention the polymer produced herein has a unimodal molecular weight distribution (Mw/Mn, MWD) as determined by Gel Permeation Chromatography (GPC-DRI). By "unimodal" is meant that the GPC trace has one peak or inflection point.

Unless otherwise indicated Mw, Mn, Mz, and MWD are determined by GPC-DRI as described in the Experimental section below.

In a preferred embodiment of the invention, any copolymer produced herein has a composition distribution breadth index (CDBI) of 50% or more, preferably 60% or more, preferably 70% or more. CDBI is a measure of the composition distribution of monomer within the polymer chains and is measured by the procedure described in PCT Publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 g/mol are ignored when determining CDBI.

In a preferred embodiment of the invention, any copolymer produced herein has a branching index, g'ave (also referred to as g'(vis ave)), of 0.95 or more (preferably 0.96 or more, preferably 0.97 or more, preferably 0.98 or more, preferably 0.99 or more). Branching index, g'ave, is determined by GPC-DRI-SEC-LS as described in the Experimental section below.

In a preferred embodiment of the invention, any copolymer produced herein has a branching index, g'(Z ave), of 0.93 or more (preferably 0.94 or more, preferably 0.95 or more, preferably 0.96 or more, preferably 0.97 or more, preferably 0.98 or more, preferably 0.99 or more). Branching index, g'(Zave), is determined by GPC-DRI-SEC-LS as described in the Experimental section below.

In a preferred embodiment of the invention, any copolymer produced herein has a Mooney large relaxation area of 170 MU*sec or more, (preferably 180 MU*sec or more, preferably 190 MU*sec or more, preferably 200 MU*sec or more). Mooney large relaxation area (MLRA), also referred to as Relaxation Area, is determined by measuring the Mooney stress relaxation starting one second after the rotor is stopped and continuing to collect measurements up to 100 seconds of stress relaxation time. MLRA is expressed in "Mooney units× sec." Calculation of these values is explained in ASTM D 1646, which is incorporated herein by reference. For example, MLRA is calculated according to the equation: $MLRA=[100^{(a+1)}-1]_x[(k)/(a+1)]$ in which "a" and "log(k)" are respectively the slope and intercept of the least squares regression line of log(Mooney torque) versus log(relaxation time) measured between 1 and 100 seconds relaxation time and using equipment built-in data sampling protocol. "k" and "a" are derived from the power law model fit to ML vs. time, with regression coefficients >0.997 in all cases.

In a preferred embodiment of the invention, any copolymer produced herein has an MLRA that is at least 10 MU*sec higher than the equivalent polymer produced under the same conditions except that N,N-dimethylanilinium(tetrakis pentaflourophenyl borate) is used as the sole non-coordination anion activator, preferably at least 20 MU*sec higher, preferably at least 25 MU*sec higher, preferably at least 30 MU*sec higher, preferably at least 40 MU*sec higher, preferably at least 50 MU*sec higher.

In a preferred embodiment of the invention, any copolymer produced herein may have an MLRA greater than $Y_0$ MU*sec, where $Y_0=Y_1+\{[(Y_2-Y_1)/(X_2-X_1)](X_0-X_1)\}$, where $X_0$ is the wt % of $NCA_1$ used to prepare the polymer in question (based upon weight of $NCA_1$ and $NCA_2$), $X_1=0$, $X_2=100$, $Y_1$=MLRA of polymer made with 100% $NCA_1$ and 0% $NCA_2$, $Y_2$ is MLRA of polymer made with 100% $NCA_2$ and 0% $NCA_1$, $NCA_1$ is the noncoordinating anion having the lower Mw, and $NCA_2$ is the NCA having the higher Mw, preferably any copolymer produced herein has an MLRA greater than $1.1*Y_0$ MU*sec, preferably greater than $1.2*Y_0$ MU*sec, preferably greater than $1.3*Y_0$ MU*sec, preferably greater than $1.4*Y_0$ MU*sec, preferably greater than $1.5*Y_0$ MU*sec. (In the event more than two NCA's are used to produce the polymer in question, the MLRA and wt % of the two highest wt % NCA's shall be used, based upon the wt % of all NCA's present.) Alternately, any copolymer produced herein may have an MLRA greater than Z MUsec, where $Z=Y_0+10$, preferably $Z=Y_0+20$, preferably $Z=Y_0+30$, preferably $Z=Y_0+40$, preferably $Z=Y_0+50$, preferably $Z=Y_0+60$, preferably $Z=Y_0+70$.

In a preferred embodiment of the invention, any copolymer produced herein has an MLRA/ML of less than 8, preferably less than 7, preferably less than 6, preferably less than 5, preferably less than 4, where ML is Mooney Viscosity as measured by ASTM D 1646 at (1+4 @125° C.).

In a preferred embodiment of the invention, any copolymer produced herein has an Mw/Mn of 4.0 or less, preferably 3.5 or less, preferably more than 1 to 4.0, preferably from 1.5 to 3.5, preferably from 1.5 to 3.0. preferably from 1.6 to 2.5.

In a preferred embodiment of the invention, any copolymer produced herein has a melting point, Tm, of 30° C. or less (preferably 20° C. or less, preferably 0° C. or less) as determined by differential scanning calorimetry (DSC) as follows.

Crystallization temperature (Tc), heat of fusion (Hf), and melting temperature (or melting point, Tm) are measured using Differential Scanning calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Melting data (first heat) is acquired by heating the sample to 210° C., at a heating rate of 10° C./min. The sample is held for 3 minutes at this temperature to destroy its thermal history. Crystallization data are acquired by cooling the sample from 210° C. to −75° C., at a cooling rate of 10° C./min. The sample is held at this temperature for at least 3 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified.

For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature). Areas under the DSC curve are used to determine the heat of transition (heat of fusion, $H_f$).

Figure 7:
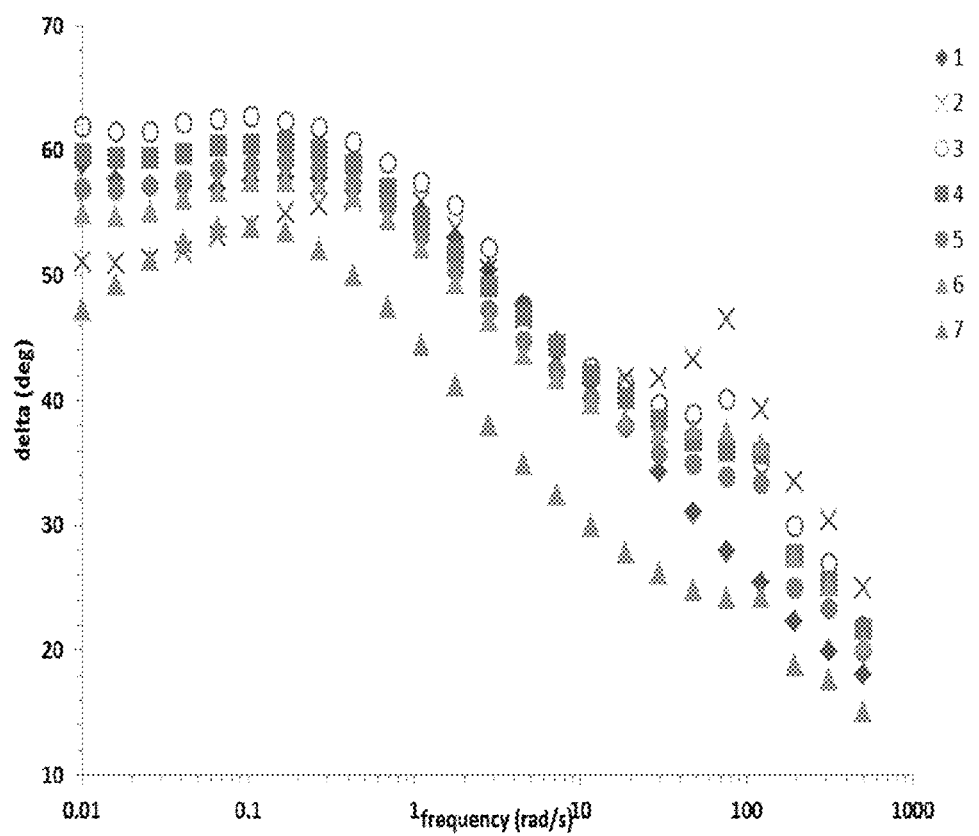
FIG. 7 is a graph of the loss angle vs. frequency for examples 1-7.

In a plot of the loss angle $\delta$ (degree) versus the measurement frequency $\omega$ (rad/s), polymers that typically have branches exhibit a plateau in the function of $\delta(\omega)$ whereas linear polymers typically do not have such a plateau. FIG. 7 compares the loss angle vs frequency for the examples 1 to 7. Sample 1 (made with cat/act1 only) shows no plateau. All other samples produced with mixed activators showed at least a plateau, if not a peak near 100 rad/s. Sample 7 (made with cat/act2 only) showed a minor discontinuity at 100 rad/s.

The loss angle $\delta$ is the arctan(G"/G') wherein G" represents the loss modulus (Pa) and G' represents the storage modulus (Pa). According to Garcia-Franco et al. (Macromolecules 2001, 34, No. 10, 3115-3117), the plateau in the aforementioned plot will shift to lower phase angles $\delta$ when the amount of long chain branching occurring in the polymer sample increases. The plot of the loss angle $\delta$ versus the measurement frequency $\omega$ is generated with data obtained using a Small Amplitude Oscillatory Shear test performed on a dynamic (oscillatory) rheometers such as Anton Parr Physica MCR500 or MCR501. The polymer specimen is compression molded to a wafer of approximately 25 mm diameter and thickness between 1.5 to 2 mm. The sample is stabilized with commercially available materials (such as Irgaonox™ 1076, Irganox™ 168, and or polyethylene glycol) to prevent thermally induced chemical changes. The dynamic rheometer is used in the dynamic mode (as opposed to steady state mode) using the parallel plates geometry, at a constant temperature of 190° C., letting the angular frequency to vary from 0.01 to 100 rad/s. Linear response of the tested polymer melt should be ensured by using small amplitudes chosen from previous amplitude scans of the linear region of the sample.

In any embodiment of the invention, in a plot of the loss angle $\delta$ (degree) versus the measurement frequency $\omega$ (rad/s), the loss angle is greater than 30 degrees at 80 rad/s, preferably 32 degrees or more, preferably 34 degrees or more, preferably 36 degrees or more, preferably 38 degrees or more, preferably between 30 and 60 degrees.

In any embodiment of the invention, in a plot of the loss angle $\delta$ (degree) versus the measurement frequency $\omega$ (rad/s), the difference between the loss angle at 30 rad/s and 80 rad/s (e.g. $\delta(\omega=30)$ minus $\delta(\omega=80)$ is 3° or less, alternately 0 or less, alternately −1° or less, alternately between 3° and −15°.

In any embodiment of the invention, in a plot of the loss angle $\delta$ (degree) versus the measurement frequency $\omega$ (rad/s), the polymers of this invention show a plateau between 30 and 80 rad/s, alternately between 30 and 100 rad/s.

In a preferred embodiment of the invention, any copolymer produced herein has good shear thinning. Shear thinning is characterized by the decrease of complex viscosity with increasing shear rate. One way to quantify the shear thinning is to use a ratio of complex viscosity at a frequency of 0.01 rad/s to the complex viscosity at a frequency of 100 rad/s. Preferably, the complex viscosity ratio is 20 or more, more preferably 50 or more, more preferably 100 or more, more preferably 200 or more, more preferably 300 or more, more preferably 500 or more, more preferably 600 or more, when the complex viscosity is measured at 125° C.

In a preferred embodiment of the invention, any copolymer produced herein may have a complex viscosity ratio (eta* (0.01 r/s)/eta*(100 rad/s), measured at 125° C.) greater than $1.1*Y_0$, where $Y_0=Y_1+\{[(Y_2-Y_1)/(X_2-X_1)](X_0-X_1)\}$, where $X_0$ is the wt % of $NCA_1$ used to prepare the polymer in question (based upon weight of $NCA_1$ and $NCA_2$), $X_1=0$, $X_2=100$, $Y_1$=complex viscosity ratio of polymer made with 100% $NCA_1$ and 0% $NCA_2$, $Y_2$ is complex viscosity ratio of polymer made with 100% $NCA_2$ and 0% $NCA_1$, $NCA_1$ is the noncoordinating anion having the lower Mw, and $NCA_2$ is the NCA having the higher Mw, preferably any copolymer produced herein has an complex viscosity ratio greater than $1.25*Y_0$, preferably greater than $1.5*Y_0$, preferably greater than $2.0*Y_0$, preferably greater than $3.0*Y_0$, preferably greater than $4.0*Y_0$, preferably greater than $4.5*Y_0$, preferably greater than $5.0*Y_0$. (In the event more than two NCA's are used to produce the polymer in question, the complex viscosity ratio and wt % of the two highest wt % NCA's shall be used, based upon the wt % of all NCA's present.)

Alternately, any copolymer produced herein may have a complex viscosity ratio greater than Z, where $Z=Y_0+100$, preferably $Z=Y_0+150$, preferably $Z=Y_0+200$, preferably $Z=Y_0+250$, preferably $Z=Y_0+300$, preferably $Z=Y_0+350$, preferably $Z=Y_0+400$.

Shear thinning can be also characterized using a shear thinning index. The term "shear thinning index" is determined using plots of the logarithm (base ten) of the dynamic viscosity versus logarithm (base ten) of the frequency. The slope is the difference in the log (dynamic viscosity) at a frequency of 100 rad/s and the log(dynamic viscosity) at a frequency of 0.01 rad/s divided by 4. These plots are the typical output of small angle oscillatory shear (SAOS) experiments. For ethylene/propylene copolymers, a conventional SAOS test temperature is 190° C. Polymer viscosity is conveniently measured in poise (dyne-second/square centimeter) at shear rates within a range of from 0 to 100 rad/sec and at 190° C. under a nitrogen atmosphere using a dynamic mechanical spectrometer such as the Advanced Rheometrics Expansion System (ARES) as described below. Generally a low value of shear thinning index indicates a polymer is highly shear thinning and that it is readily processable in high shear processes, for example by injection molding. The more negative this slope, the faster the dynamic viscosity decreases as the frequency increases. Preferably, any polymer produced herein has a shear thinning index of less than −0.2, preferably less than −0.5, preferably less than −0.6, preferably less than −0.65, preferably less than −0.7, preferably less than −0.75. These types of polymers are easily processed in high shear rate fabrication methods, such as injection molding.

Figure 8:
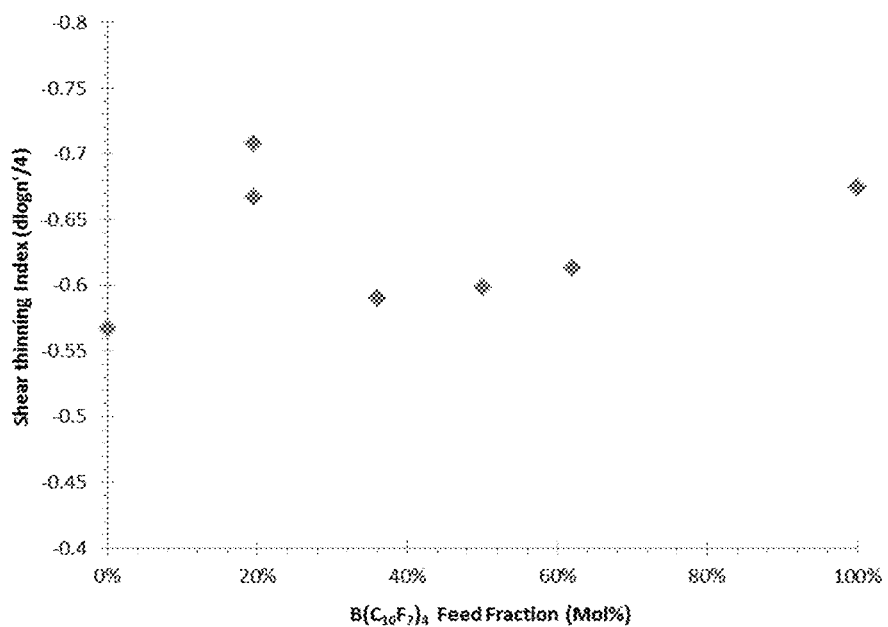
FIG. 8 is a plot of shear thinning index vs. activator content for examples 1-7.
Figure 9:
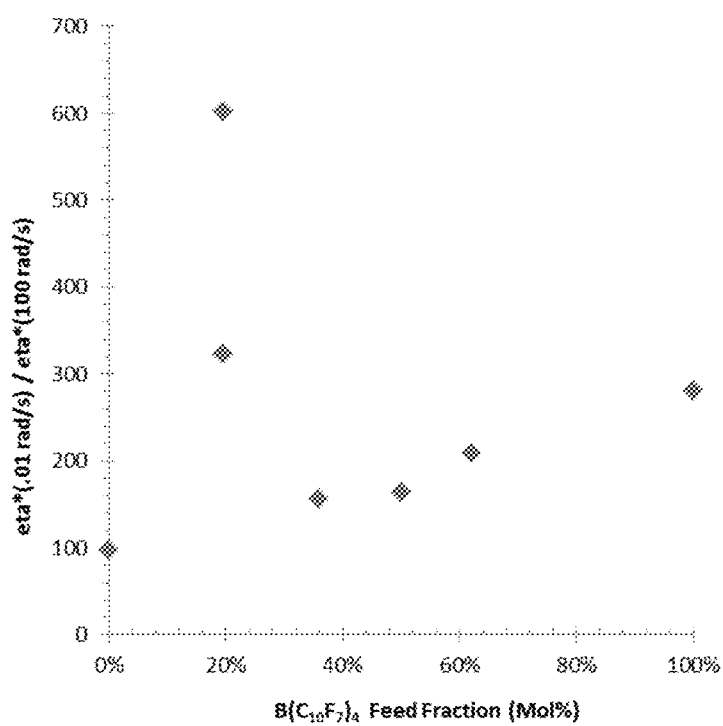
FIG. 9 is a plot of complex viscosity ratio (eta*(0.01 rad/s)/eta*(100 rad/s), at 125° C.) versus activator content for examples 1-7.

FIG. 8 is a plot of shear thinning index calculated using the above described method versus activator 2 content. Note that examples 2 and 3 show the largest negative index, indicating the most shear thinning properties of this sample set.

Dynamic shear melt rheological data is measured with an Advanced Rheometrics Expansion System (ARES) using parallel plates (diameter=25 mm) at a temperature of 125° C. using a pristine compression molded sample. The measurements were made over the angular frequency ranged from 0.01-500 rad/s. Depending on the molecular weight and temperature, strains of 10% and 15% were used and linearity of the response was verified. A nitrogen stream was circulated through the sample oven to minimize chain extension or cross-linking during the experiments. All the samples were compression molded at 125° C. and no stabilizers were added. A sinusoidal shear strain is applied to the material if the strain amplitude is sufficiently small the material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, 5=90° (stress leads the strain by 90° although the stress is in phase with the strain rate). For viscoelastic materials 0<δ<90. The shear thinning slope (STS) was measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4.

Catalyst Compounds, Activators, and Catalyst Systems

Catalyst compounds and catalyst systems comprising such compounds, useful herein are typically metallocenes, such as those represented by the formula (I):

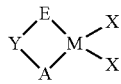

wherein:

M is a group 3, 4, 5 or 6 transition metal atom, a lanthanide metal atom, or an actinide metal atom, preferably Hf, Ti or Zr;
E is substituted or unsubstituted indenyl ligand or a substituted or unsubstituted fluorenyl ligand (i.e., bonded to Y through the one, two, three, four, five, six, seven, eight, or nine position of the fluorenyl ring);
A is substituted or unsubstituted indenyl ligand or a substituted or unsubstituted cyclopentadienyl ligand,
provided that when E is substituted or unsubstituted indenyl ligand, then A is also a substituted or unsubstituted indenyl ligand;
Y is a Group 15 or 16 bridging heteroatom containing substituent that is bonded to E and A; and
each X is, independently, a univalent anionic ligand, or both X are joined and bound to the metal atom to form a metallocycle ring, or both X join to form a chelating ligand, a diene ligand, or an alkylidene ligand.

Preferred catalyst compounds and catalyst systems comprising such compounds, useful herein include metallocenes represented by the formula (II):

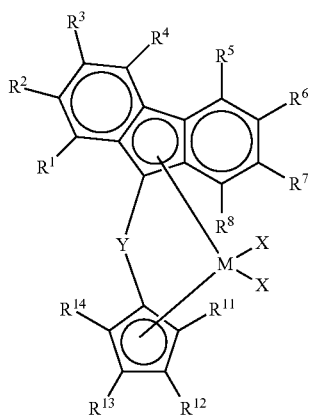

where:

M is a group 3, 4, 5 or 6 transition metal atom, or a lanthanide metal atom, or actinide metal atom (preferably a Group 4 metal (preferably Hf Ti and/or Zr, preferably Hf or Zr));

$R^1$, $R^2$, $R^3$, $R^4$, $R^5$, $R^6$, $R^7$, $R^8$, $R^{11}$, $R^{12}$, $R^{13}$, and $R^{14}$, are independently, hydrogen, or a hydrocarbyl, substituted hydrocarbyl, halogen, halocarbyl, substituted halocarbyl, silylcarbyl, substituted silylcarbyl, germylcarbyl, substituted germylcarbyl;
Y is a bridging group containing a Group 13, 14, 15, or 16 element; and
each X is a univalent anionic ligand, or two X are joined and bound to the metal atom to form a metallocycle ring, or two X are joined to form a chelating ligand, a diene ligand, or an alkylidene ligand.

In a preferred embodiment of the invention in any embodiment of any formula described herein, each R', $R^1$, $R^2$, $R^3$, $R^4$, $R^5$, $R^6$, $R^7$, $R^8$, $R^{11}$, $R^{12}$, $R^{13}$, and $R^{14}$ is independently, hydrogen, a substituted hydrocarbyl group, an unsubstituted hydrocarbyl group, or a heteroatom (preferably a C1 to C20 substituted hydrocarbyl group, or a C1 to C20 unsubstituted hydrocarbyl group, preferably hydrogen, methyl, ethyl, propyl, butyl, pentyl, hexyl, phenyl, substituted phenyl or an isomer thereof, preferably t-butyl).

In a preferred embodiment of the invention in any embodiment of any formula described herein, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group.

In a preferred embodiment of the invention in any embodiment of any formula described herein, Y is a bridging group and comprises Si, Ge, or C, preferably Y is dialkyl silicon, dialkyl germanium, or dialkyl methylene, preferably Y is dimethyl silicon or bis(4-triethylsilylphenyl)methylene.

In a preferred embodiment of the invention in any embodiment of any formula described herein, Y is a bridging group and is represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'2GeCR'2GeR'2, R'2SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR'—CR'$_2$ where each R' is, independently, hydrogen or a $C_1$ to $C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferably, Y is a bridging group comprising carbon or silica, such as dialkylsilyl, preferably Y is selected from $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p-(Et)_3SiPh)_2C$, and silylcyclopentyl ($Si(CH_2)_4$). In a preferred embodiment of the invention in any embodiment of any formula described herein, Y is represented by the formula $R_2{}^a J$, where J is C, Si, or Ge, and each $R_a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system.

In a preferred embodiment of the invention in any embodiment of any formula described herein, Y is represented by the formula $R_2{}^bJ$, where J is C, Si, or Ge, and each $R^b$ is, independently, hydrogen, halogen, $C_1$ to $C_{20}$ hydrocarbyl or a $C_1$ to $C_{20}$ substituted hydrocarbyl, and two $R^b$ can form a cyclic structure including aromatic, partially saturated, or saturated cyclic or fused ring system, provided that at least one $R^b$ contains at least one hydrocarbylsilyl substituent group, preferably represented by the formula: $R_n"SiR*_{3-n}$, where each R* is independently a $C_1$-$C_{20}$ hydrocarbyl, hydrocarbylsilyl, hydrofluorocarbyl substitutent, R" is a $C_1$-$C_{10}$ linking group between Si and the aryl group, and n=0 or 1.

In a preferred embodiment of the invention in any embodiment of any formula described herein, Y is bis(4-triethylsilylphenyl)methylene.

Alternately, the catalyst useful herein is a bridged bisindenyl compound represented by the formula: $Y(Ind)_2MX_2$, or $Y(2\text{-alkyl}*\text{-}4\text{-Ph}*Ind)_2MX_2$ where Y, M, and X are as defined above and each Ind is, independently, a substituted or unsubstituted indenyl compound (preferably substituted with 1, 2, 3, 4, 5, or 6 R^groups, where each R^group is, independently, as defined for R1 above), alkyl* is an alkyl group, preferably a C1 to C20 alkyl group, preferably methyl, ethyl, propyl, butyl, pentyl, hexyl, octyl, nonyl, decyl or an isomer thereof, and Ph* is a substituted or unsubstituted phenyl group (preferably substituted with 1, 2, 3, 4, or 5 R^groups, preferably methyl, ethyl, propyl, butyl, pentyl, hexyl, octyl, nonyl, decyl or an isomer thereof such as t-butyl).

Useful metallocene compounds also include those represented by the formula: $Me_2Si\text{-bis}(2\text{-}R^{50},4\text{-Ph-indenyl})MX_2$, where $R^{50}$ is an alkyl group (such as methyl), Ph is phenyl or substituted phenyl, M is Hf, Zr or Ti, and X is a halogen or alkyl group (such as chloride or methyl). Particularly useful catalyst compounds include: dimethylsilyl-bis(2-methyl,4-phenyl-indenyl)zirconium dimethyl (or dichloride), dimethylsilyl-bis(2-methyl,4-(3',5'-di-t-butyl-phenyl)-indenyl)zirconium dimethyl (or dichloride), dimethylsilyl-bis(2-methyl, 4-naphthyl-indenyl)zirconium dimethyl (or dichloride), and dimethylsilyl-bis(2-methyl,4-(3',5'-di-t-butyl-naphthyl)-indenyl)zirconium dimethyl (or dichloride).

In a preferred embodiment of the invention the catalyst compound is represented by the formula (III):

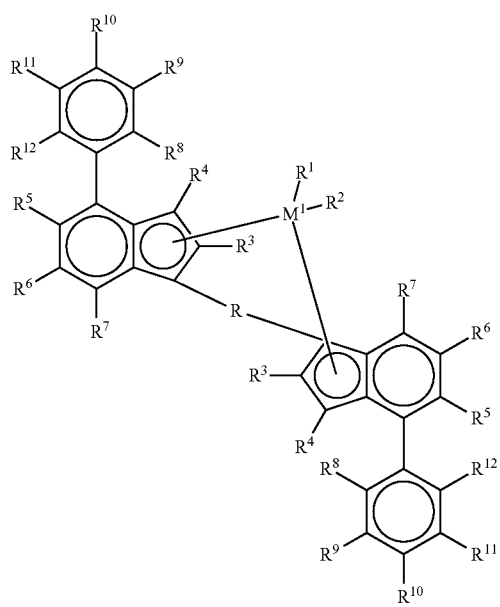

(III)

where $M^1$ is selected from titanium, zirconium, hafnium, vanadium, niobium, tantalum, chromium, molybdenum, or tungsten (preferably zirconium and or hafnium);

$R^1$ and $R^2$ are identical or different and are selected from hydrogen atoms, C1-C10 alkyl groups, C1-C10 alkoxy groups, C6-C10 aryl groups, C6-C10 aryloxy groups, C2-C10 alkenyl groups, C2-C40 alkenyl groups, C7-C40 arylalkyl groups, C7-C40 alkylaryl groups, C8-C40 arylalkenyl groups, OH groups or halogen atoms; or conjugated dienes that are optionally substituted with one or more hydrocarbyl, tri(hydrocarbyl)silyl groups or hydrocarbyl tri(hydrocarbyl) silylhydrocarbyl groups (preferably $R^1$ and $R^2$ are an alkyl such as methyl or ethyl or are a halide such as chloride);

$R^3$, $R^4$, $R^5$, $R^6$, $R^7$, $R^8$, $R^9$, $R^{10}$, $R^{11}$ and $R^{12}$ are the same or different and are selected from hydrogen atoms, halogen atoms, C1-C10 halogenated or unhalogenated alkyl groups, C6-C10 halogenated or unhalogenated aryl groups, C2-C10 halogenated or unhalogenated alkenyl groups, C7-C40 halogenated or unhalogenated arylalkyl groups, C7-C40 halogenated or unhalogenated alkylaryl groups, C8-C40 halogenated or unhalogenated arylalkenyl groups, —NR'$_2$, —SR', —OR', —OSiR'$_3$ or —PR'$_2$ radicals in which R' is one of a halogen atom, a C1-C10 alkyl group, or a C6-C10 aryl group; or two or more adjacent radicals $R^5$ to $R^7$ together with the atoms connecting them can form one or more rings (preferably $R^3$ is methyl, ethyl or butyl), and adjacent radicals $R^{11}$ and $R^{12}$ can form one or more saturated or aromatic rings (preferably $R^{11}$ and $R^{12}$ combine with the phenyl ring to form a substituted or unsubstituted naphthyl group), in an advantageous embodiment, $R^9$ and $R^{11}$ are a C1 to C20 hydrocarbyl group, or a C3 to C12 alkyl group, advantageously a t-butyl group; $R^{13}$ is selected from:

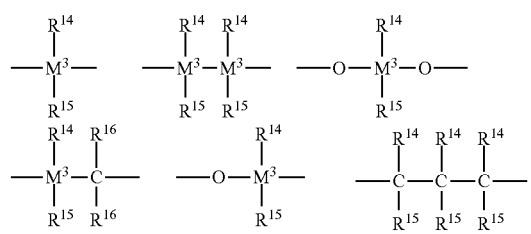

—B($R^{14}$)—, —Al($R^{14}$)—, —Ge—, —Sn—, —O—, —S—, —SO—, —SO$_2$—, —N($R^{14}$)—, —CO—, P($R^{14}$)—, —P(O)($R^{14}$)—, —B(NR$^{14}$R$^{15}$)— and —B[N(SiR$^{14}$R$^{15}$ R$^{16}$)$_2$]—, $R^{14}$, $R^{15}$ and $R^{16}$ are each independently selected from hydrogen, halogen, C1-C20 alkyl groups, C6-C30 aryl groups, C1-C20 alkoxy groups, C2-C20 alkenyl groups, C7-C40 arylalkyl groups, C8-C40 arylalkenyl groups and C7-C40 alkylaryl groups, or $R^{14}$ and $R^{15}$, together with the atom(s) connecting them, form a ring; and $M^3$ is selected from carbon, silicon, germanium and tin, or $R^{13}$ is represented by the formula (IV):

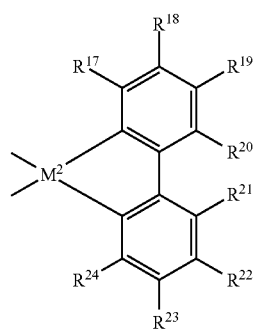

wherein $R^{17}$ to $R^{24}$ are as defined for $R^1$ in Formula (II), or two or more adjacent radicals $R^{17}$ to $R^{24}$, including $R^{20}$ and R$^{21}$, together with the atoms connecting them form one or more rings; M$^2$ is carbon, silicon, germanium, or tin (preferably R$^{13}$ is dimethyl silyl or diphenylsilyl).

Specific exemplary bridged hafnium catalysts useful herein include those derived from: indenyl-based complexes such as the isomers, or mixtures, of di(para-triethylsilyl-phenyl)methylene bis(indenyl) hafnium dimethyl, di(para-trimethylsilyl-phenyl)methylene bis(indenyl) hafnium dimethyl, of di(para-tri-n-propylsilyl-phenyl)methylene bis(indenyl) hafnium dimethyl, (para-triethylsilyl-phenyl) (para-t-butylphenyl)methylene (fluorenyl) (indenyl) hafnium dimethyl, (para-triethylsilyl-phenyl) (para-methylphenyl)methylene (fluorenyl) (indenyl) hafnium dimethyl, di(para-triethylsilyl-phenyl)methylene (2,7-di tertbutyl fluorenyl) (indenyl) hafnium dimethyl, (para-trimethylsilyl-phenyl) (para-n-butylphenyl)methylene (2,7-di tertbutyl fluorenyl) (indenyl) hafnium dimethyl, (para-triethylsilyl-phenyl) (para-n-butylphenyl)methylene bis(tetrahydroindenyl) hafnium dibenzyl and di(para-triethylsilyl-phenyl)methylene bis(tetrahydroindenyl) hafnium dimethyl. For further information on such catalyst compounds please see U.S. Pat. No. 6,528,670.

Similarly, exemplary zirconium compounds include di(para-triethylsilyl-phenyl)methylene bis(indenyl) zirconium dimethyl, di(para-trimethylsilyl-phenyl)methylene bis (indenyl) zirconium dimethyl, of di(para-tri-n-propylsilyl-phenyl)methylene bis(indenyl) zirconium dimethyl, (para-triethylsilyl-phenyl) (para-t-butylphenyl)methylene (fluorenyl) (indenyl) zirconium dimethyl, (para-triethylsilyl-phenyl) (para-methylphenyl)methylene (fluorenyl) (indenyl) zirconium dimethyl, di(para-triethylsilyl-phenyl)methylene (2,7-di tertbutyl fluorenyl) (indenyl) zirconium dimethyl, (para-trimethylsilyl-phenyl) (para-n-butylphenyl)methylene (2,7-di tertbutyl fluorenyl) (indenyl) zirconium dimethyl, (para-triethylsilyl-phenyl) (para-n-butylphenyl)methylene bis(tetrahydroindenyl) zirconium dibenzyl and di(para-triethylsilyl-phenyl)methylene bis(tetrahydroindenyl) zirconium dimethyl. Additional preferred zirconium metallocenes useful when prepared with the solubilizing bridging groups in accordance with this invention are those described in copending U.S. application Ser. No. 09/251,819, filed Feb. 17, 1999, and equivalent WO 99/41294. These catalyst structures and the solution polymerization process described with them are particularly suited for this invention, and are incorporated by reference herein. For further information on such catalyst compounds please see U.S. Pat. No. 6,528,670.

Particularly suitable cyclopentadienyl-based complexes are the compounds, isomers, or mixtures, of (para-trimethylsilylphenyl)(para-n-butylphenyl)methylene (fluorenyl) (cyclopentadienyl) hafnium dimethyl, di(para-trimethylsilylphenyl)methylene (2,7-di-tertbutyl fluorenyl) (cyclopentadienyl) hafnium dimethyl, di(para-triethylsilylphenyl)methylene (2,7-di-tertbutyl-fluorenyl) (cyclopentadienyl) hafnium dimethyl, (para-triethylsilylphenyl) (para-t-butylphenyl)methylene (2,7-di tertbutyl fluorenyl) (cyclopentadienyl) hafnium dimethyl or dibenzyl, and di(para-triethylsilyl-phenyl)methylene (2,7-dimethylfluorenyl)(cyclopentadienyl) hafnium dimethyl or dibenzyl. The zirconocene analogues are (para-trimethylsilylphenyl)(para-n-butylphenyl)methylene (fluorenyl) (cyclopentadienyl) zirconium dimethyl, di(para-trimethylsilylphenyl)methylene (2,7-di-tertbutyl fluorenyl) (cyclopentadienyl) zirconium dimethyl, di(para-triethylsilylphenyl)methylene (2,7-di-tert-butyl-fluorenyl) (cyclopentadienyl) zirconium dimethyl, (para-triethylsilylphenyl) (para-t-butylphenyl)methylene (2,7-di tertbutyl fluorenyl) (cyclopentadienyl) zirconium dimethyl or dibenzyl, and di(para-triethylsilyl-phenyl)methylene (2,7-dimethylfluorenyl)(cyclopentadienyl) zirconium dimethyl or dibenzyl. It has been found that the substituted bridge-containing compounds, such as those asymmetric compounds listed above, are particularly useful in accordance with the invention.

For further information on such catalyst compounds please see U.S. Pat. No. 6,528,670. In particular, for the bridged metallocene compounds, increasing the degree of substitution on an aromatic fused-ring substituted ligand Cp can be effective for increased molecular weight, e.g., 2,7-dimethyl-fluorenyl, 2,7-di-tert-butyl-fluorenyl and 2,7-methyl-phenyl-fluorenyl groups are exemplary of such. Preferably substitution on fluorenyl or indenyl radicals in the metallocene compounds will generally comprise two or more C$_1$ to C$_{30}$ hydrocarbyl or hydrocarbylsilyl replacements, or substitutions, for a ring hydrogen of at least one 6-member fused-ring. For further information on such catalyst compounds please see U.S. Pat. No. 6,528,670.

In a preferred embodiment in any of the processes described herein one catalyst compound is used, e.g. the catalyst compounds are not different. For purposes of this invention one metallocene catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of this invention, e.g., rac-dimethylsilylbis(2-methyl 4-phenyl)hafnium dimethyl is considered to be the same as meso-dimethylsilylbis(2-methyl 4-phenyl)hafnium dimethyl.

In some embodiments, two or more different catalyst compounds are present in the catalyst systems used herein. In some embodiments, two or more different catalyst systems are used herein. In some embodiments, two or more different catalyst compounds are present in the reaction zone where the process(es) described herein occur. When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Particularly useful catalyst compounds for use herein may be prepared as known in the art, or as described in U.S. Pat. No. 6,506,857 (particularly Example 1) and U.S. Pat. No. 5,840,644, U.S. Pat. No. 5,936,053, U.S. Pat. No. 6,376,408, U.S. Pat. No. 6,888,017, WO 98/40419, and WO 99/42497.

The catalyst compounds described herein are combined with an activator(s) to form a catalyst system and used in the polymerization processes described herein.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942, 459), or combination thereof. It is also within the scope of this invention to use neutral or ionic activators alone or in combination with alumoxane or modified alumoxane activators.

Examples of neutral stoichiometric activators include trisubstituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. No. 5,153,157; U.S. Pat. No. 5,198,401; U.S. Pat. No. 5,066,741; U.S. Pat. No. 5,206,197; U.S. Pat. No. 5,241,025; U.S. Pat. No. 5,384,299; U.S. Pat. No. 5,502,124; and U.S. Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277,003 A1, and EP 0 277,004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (II):

$$(Z)_d^+(A^{d-}) \quad\quad (II)$$

wherein Z is (L-H) or a reducible Lewis Acid, L is an neutral Lewis base; H is hydrogen; $(L-H)^+$ is a Bronsted acid; $A^{d-}$ is a non-coordinating anion having the charge d−; and d is an integer from 1 to 3.

When Z is (L-H) such that the cation component is $(L-H)_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation $(L-H)_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: $(Ar_3C^+)$, where Ar is aryl or aryl substituted with a heteroatom, a $C_1$ to $C_{40}$ hydrocarbyl, or a substituted C1 to C40 hydrocarbyl, preferably the reducible Lewis acid is represented by the formula: $(Ph_3C^+)$, where Ph is phenyl or phenyl substituted with a heteroatom, a $C_1$ to C40 hydrocarbyl, or a substituted C1 to C40 hydrocarbyl. In a preferred embodiment, the reducible Lewis acid is triphenyl carbenium.

The anion component $A^{d-}$ include those having the formula $[M^{k+}Q_n]^{d-}$ wherein k is 1, 2, or 3; n is 1, 2, 3, 4, 5, or 6, preferably 3, 4, 5 or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In a preferred embodiment, this invention relates to a method to polymerize olefins comprising contacting olefins (preferably ethylene) with an amidinate catalyst compound, a chain transfer agent and a boron containing NCA activator represented by the formula (14):

$$Z_d^+(A^{d-}) \quad (14)$$

where: Z is (L-H) or a reducible Lewis acid; L is an neutral Lewis base (as further described above); H is hydrogen; (L-H) is a Bronsted acid (as further described above); $A^{d-}$ is a boron containing non-coordinating anion having the charge d− (as further described above); d is 1, 2, or 3.

In a preferred embodiment in any NCA's represented by Formula 14 described above, the reducible Lewis acid is represented by the formula: $(Ar_3C^+)$, where Ar is aryl or aryl substituted with a heteroatom, a $C_1$ to $C_{40}$ hydrocarbyl, or a substituted C1 to C40 hydrocarbyl, preferably the reducible Lewis acid is represented by the formula: $(Ph_3C^+)$, where Ph is phenyl or phenyl substituted with a heteroatom, a $C_1$ to $C_{40}$ hydrocarbyl, or a substituted C1 to C40 hydrocarbyl.

In a preferred embodiment in any of the NCA's represented by Formula 14 described above, $Z_d^+$ is represented by the formula: $(L-H)_d^+$, wherein L is an neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

In a preferred embodiment in any of the NCA's represented by Formula 14 described above, the anion component $A^{d-}$ is represented by the formula $[M^{*k*}±Q^*_{n*}]^{d*-}$ wherein k* is 1, 2, or 3; n* is 1, 2, 3, 4, 5, or 6 (preferably 1, 2, 3, or 4); n*−k*=d*; M* is boron; and Q* is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q* having up to 20 carbon atoms with the proviso that in not more than 1 occurrence is Q* a halide.

This invention also relates to a method to polymerize olefins comprising contacting olefins (such as ethylene) with catalyst compound and an NCA activator represented by the formula (I):

$$R_nM^{**}(ArNHal)_{4-n} \quad (I)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula I also comprises a suitable cation that is essentially non-interfering with the ionic catalyst complexes formed with the transition metal compounds, preferably the cation is $Z_d^+$ as described above.

In a preferred embodiment in any of the NCA's comprising an anion represented by Formula I described above, R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl groups; $-SR^1$, $-NR^2_2$, and $-PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

In a preferred embodiment in any of the NCA's comprising an anion represented by Formula I described above, the NCA also comprises cation comprising a reducible Lewis acid represented by the formula: $(Ar_3C^+)$, where Ar is aryl or aryl substituted with a heteroatom, a $C_1$ to $C_{40}$ hydrocarbyl, or a substituted C1 to C40 hydrocarbyl, preferably the reducible Lewis acid represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCA's comprising an anion represented by Formula I described above, the NCA also comprises a cation represented by the formula, $(L-H)_d^+$, wherein L is an neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof Further examples of useful activators include those disclosed in U.S. Pat. Nos. 7,297,653 and 7,799,879.

Another activator useful herein comprises a salt of a cationic oxidizing agent and a noncoordinating, compatible anion represented by the formula (16):

$$(OX^{e+})_d(A^{d-})_e \quad (16)$$

wherein $OX^{e+}$ is a cationic oxidizing agent having a charge of e+; e is 1, 2, or 3; d is 1, 2 or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Preferred embodiments of $A^{d-}$ include tetrakis(pentafluorophenyl)borate.

In another embodiment, the catalyst compounds described herein can be used with Bulky activators. A "Bulky activator" as used herein refers to anionic activators represented by the formula:

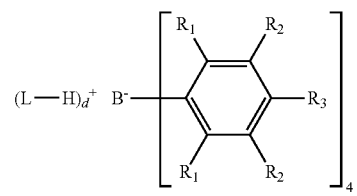

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);

each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);

L is a neutral Lewis base; $(L-H)^+$ is a Bronsted acid; d is 1, 2, or 3;

wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_S$ | MV Per subst. (Å$^3$) | Total MV (Å$^3$) |
|---|---|---|---|---|---|
| Dimethylanilinium tetrakis(perfluoronaphthyl)borate | | $C_{10}F_7$ | 34 | 261 | 1044 |
| Dimethylanilinium tetrakis(perfluorobiphenyl)borate | | $C_{12}F_9$ | 42 | 349 | 1396 |
| [4-tButyl—PhNMe$_2$H] [$(C_6F_3(C_6F_5)_2)_4$B] | | $C_{18}F_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][(C$_6$F$_3$(C$_6$F$_5$)$_2$)$_4$B], and the types disclosed in U.S. Pat. No. 7,297,653.

Illustrative, but not limiting, examples of boron compounds which may be used as an activator in the processes of this invention are: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl) ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl) ammonium tetrakis-(2,3,4,6-tetrafluoro-phenyl)borate, dimethyl(t-butyl)ammonium tetrakis-(2,3,4,6-tetrafluorophenyl) borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis (perfluoronaphthyl)borate, triethylammonium tetrakis (perfluoronaphthyl)borate, tripropylammonium tetrakis (perfluoronaphthyl)borate, tri(n-butyl)ammonium tetrakis (perfluoronaphthyl)borate, tri(t-butyl)ammonium tetrakis (perfluoronaphthyl)borate, N,N-dimethylanilinium tetrakis (perfluoronaphthyl)borate, N,N-diethylanilinium tetrakis (perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene (diazonium)tetrakis(3,5-bis(trifluoromethyl)phenyl)borate, and dialkyl ammonium salts, such as: di-(i-propyl)ammonium tetrakis(pentafluorophenyl)borate, and dicyclohexylammonium tetrakis(pentafluorophenyl)borate; and additional tri-substituted phosphonium salts, such as tri(o-tolyl) phosphonium tetrakis(pentafluorophenyl)borate, and tri(2,6-dimethylphenyl)phosphonium tetrakis(pentafluorophenyl) borate.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4^-$], [Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium)tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium)tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In a preferred embodiment, any of the activators described herein may be mixed together before or after combination with the catalyst compound, preferably before being mixed with the catalyst compound.

In some embodiments, two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, preferably 0.1:1 to 1000:1, preferably 1:1 to 100:1.

Further, the typical activator-to-catalyst ratio, e.g., all NCA activators-to-catalyst ratio is a 1:1 molar ratio. Alternate preferred ranges include from 0.1:1 to 100:1, alternately from 0.5:1 to 200:1, alternately from 1:1 to 500:1, alternately from 1:1 to 1000:1. A particularly useful range is from 0.5:1 to 10:1, preferably 1:1 to 5:1.

In a preferred embodiment of the invention, the catalyst compound is mixed with the first and second activators separately, e.g. a portion of Catalyst A is mixed with Activator A and a second portion of Catalyst A is mixed with activator B. These two mixtures are allowed to react separately and then may be introduced into the polymerization reaction separately or together, at the same or different times.

In a preferred embodiment of the invention, the catalyst compound is mixed with the first and second activators at the same time, e.g., a portion of Catalyst A is mixed with Activator A and with Activator B. The mixture is then introduced into the polymerization reaction.

In a preferred embodiment of the invention, the two non-coordinating anion activators are chosen such that they produce polymers under the conditions of interest having at least one order of magnitude difference in weight average molecular weight (preferably at least 2 orders of magnitude, preferably at least 3 orders of magnitude, preferably at least 4 orders of magnitude). This Mw of the polymer produced is determined in reaction conditions that are the same for each activator, except that the other activator(s) is not present. In a preferred embodiment of the invention, the polymer having the lower Mw has an Mw of at least 10,000 g/mol, preferably at least 30,000 g/mol, preferably at least 40,000 g/mol, preferably at least 50,000 g/mol. In a preferred embodiment of the invention, the polymer having the higher Mw has an Mw of at least 50,000 g/mol, preferably at least 100,000 g/mol, preferably at least 150,000 g/mol.

Alternately, in another preferred embodiment of the invention, the two non-coordinating anion activators are chosen such that they produce polymers under the conditions of interest having a difference in Mw of at least 50,000 g/mol, preferably at least 100,000 g/mol, preferably at least 200,000 g/mol.

In a preferred embodiment of the invention, the two non-coordinating anion activators are chosen such that they produce polymers under the conditions of interest having at least one order of magnitude difference in Mooney viscosity (preferably at least 2 orders of magnitude, preferably at least 3 orders of magnitude, preferably at least 4 orders of magnitude). This Mooney viscosity of the polymer produced is determined in reaction conditions that are the same for each activator, except that the other activator(s) is not present. In a preferred embodiment of the invention, the polymer having the lower Mooney viscosity has Mooney viscosity of at least 10 MU, preferably at least 20 MU, preferably at least 50 MU. In a preferred embodiment of the invention, the polymer having the higher Mw has an Mw of at least 30 MU, preferably at least 50 MU, preferably at least 70 MU.

Alternately, in another preferred embodiment of the invention, the two non-coordinating anion activators are chosen such that they produce polymers under the conditions of interest having a difference in Mooney viscosity of at least 10 MU, preferably at least 20 MU, preferably at least 30 MU.

It is also within the scope of this invention that the catalyst compounds can be combined with combinations of alumoxanes and NCA's (see for example, U.S. Pat. No. 5,153,157, U.S. Pat. No. 5,453,410, EP 0 573 120 B1, WO 94/07928, and WO 95/14044 which discuss the use of an alumoxane in combination with an ionizing activator).

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Monomers

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomer comprises ethylene, propylene, diene and optional comonomers comprising one or more or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_2$ to $C_{40}$ olefins useful as monomers and comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, one or more dienes, preferably two or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments, 500 ppm or less of diene is added to the polymerization, preferably 400 ppm or less, preferably or 300 ppm or less. In other embodiments, at least 50 ppm of diene is added to the polymerization, or 100 ppm or more, or 150 ppm or more. When two or more dienes are present, the dienes are preferably present in the ratio of 1:1 to 500:1, preferably 2:1 to 250:1, preferably 10:1 to 200:1 (wt/wt). In a preferred embodiment of the invention, the dienes comprise ethylidene norbornene (ENB) and vinyl norbornene (VNB) are present at a ratio of 1:1 to 500:1, preferably 2:1 to 250:1, preferably 10:1 to 200:1, preferably to 15:1 to 150:1, preferably 20:1 to 150:1 (wt/wt).

Preferred diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions. In a particularly preferred embodiment of the invention the dienes comprise ENB and VNB.

In a particularly preferred embodiment of the invention, the monomers used in any process described herein with any catalyst system described herein are a first C2 to C12 alpha olefin monomer (such as ethylene), a comonomer of a second C3 to C12 alpha olefin (such as propylene), and at least two dienes, preferably cyclic dienes, preferably cyclic non-conjugated dienes, preferably C7 to C30 cyclic non conjugated dienes, preferably vinylnorbornene and ethylidene norbornene.

In a particularly preferred embodiment of the invention, the monomers used in any process described herein with any catalyst system described herein are ethylene, propylene, vinylnorbornene and ethylidene norbornene.

In a particularly preferred embodiment of the invention, the monomers used in any process described herein with any catalyst system described herein are ethylene, propylene, vinylnorbornene and ethylidene norbornene, where the copolymer has:
a) an ethylene content of 35 to 90 mol % (preferably 40 to 80 mol %, preferably 50 to 75 mol %);
b) a propylene content of 9.8 to 64.8 mol % (preferably 19.8 to 59.8 mol %, preferably 24.8 to 49.8 mol %);
c) diene content of 0.2 to 5 mol % (preferably 0.3 to 3.0 mol %, preferably 0.5 to 2.5 mol %).
Process The invention in any embodiment comprises a method to provide a polymerization reactor with a tunable supply of catalyst as a means of adjusting the Mw/Mn of the copolymer. Most preferably, the Mw/Mn is tuned within a range from 1.8 or 2.0, or 2.5 to 3.5, or 4.0, or 4.5, or 5.0. In any embodiment, metallocene and activator are fed to the polymerization reactor having a Catalyst Feed Ratio (the mole fraction of catalyst compound to the second activator in the stream sent to the reactor) varied such as to tune the Mw/Mn of the resulting copolymer, the Catalyst Feed Ratio within a range from 5% to 40%, preferably 10% to 30%. Further, this invention relates to polymerization processes where monomer (such as ethylene) and comonomer (such as propylene and diene monomers), are contacted with a catalyst system comprising at least two NCA activators and at least one metallocene compound. The catalyst compound and activators may be combined in any order, and are combined typically prior to contacting with the monomer. In a preferred embodiment of the invention, the same catalyst compound is combined with the first and second activators and the two activated catalyst compounds are injected into the reaction zone separately.

In particular, this invention also relates to a method to polymerize olefins comprising contacting a catalyst compound with at least two NCA activators, ethylene, propylene and one or more dienes to obtain the EPDM copolymers described above, where the polymerization process is a solution process, occurs at a temperature of 0 to 300° C., preferably 20 to 200° C. (preferably 60 to 150° C., preferably 80 to 140° C.) and a pressure of greater than 0.1 MPa (preferably 0.5 to 30 MPa, preferably from 1 MPa to 10 MPa, preferably from 1.2 to 5 MPa, preferably from 1.5 to 3 MPa), where the amount of diene in all feeds to the polymerization zone is typically from 0.05 to 10 mol %.

Process Conditions

Polymerization processes of this invention can be carried out in any manner known in the art. Any homogeneous, bulk, supercritical, supersolution, or solution phase polymerization process known in the art can be used. Such processes can be run in a batch, semi-batch, or continuous mode. Homogeneous polymerization processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process. Preferred amounts of the first alpha olefin (such as ethylene) in the feed are from 0.5 to 20 vol %, preferably 1 to 10 vol %, preferably 3 to 8 vol %, such as 6 vol %. Preferred amounts of the second alpha olefin (such as propylene) in the feed are 0.5 to 20 vol %, preferably 1 to 10 vol %, preferably 3 to 8 vol %, such as 6 vol %. Preferred amounts of the first diene (such as ENB) in the feed are 0.01 to 20 vol %, preferably 0.1 to 10 vol %, preferably 0.5 to 3 vol %, such as 1 vol %. Preferred amounts of the second diene (such as VNB) in the feed are 0.01 to 20 vol %, preferably 0.1 to 10 vol %, preferably 0.5 to 3 vol %, such as 1 vol %.

Preferred polymerizations can be run at any temperature and/or pressure suitable to obtain the desired ethylene polymers. Typical temperatures and/or pressures include a temperature in the range of from about 100° C. to about 300° C., preferably about 105° C. to about 200° C., preferably about 105° C. to about 175° C.; and at a pressure in the range of greater than 1 MPa to about 30 MPa, preferably from about 1.5 MPa to about 20 MPa, or preferably from about 2 MPa to about 10 MPa.

In a typical polymerization, the run time of the reaction is up to 300 minutes, preferably in the range of from about 5 to 250 minutes, or preferably from about 10 to 120 minutes.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In an alternate embodiment, the activity of the catalyst is at least 500 g/g, preferably 1000 or more g/g, preferably 10,000 or more g/g. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 60 to 150° C., preferably 80 to 140° C.); 2) is conducted at a pressure of greater than 1 MPa to 30 MPa (preferably 1.5 to 20 MPa, preferably from 2 to 10 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents); 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1; 5) the polymerization preferably occurs in one reaction zone; 6) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 15:1, preferably less than 10:1); and 7) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Blends

In another embodiment, the polymer produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer produced herein (preferably the EPDM) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

Specifically, any of the foregoing polymers, such as the foregoing EPDMs or blends thereof, may be used in a variety of end-use applications. Such applications include, for example, mono- or multi-layer blown, extruded, and/or shrink films and molded products.

This invention further relates to

1. A copolymer comprising a first alpha olefin, a second alphaolefin and diene, where the copolymer has: a) first alpha olefin content of 35 to 90 mol %; b) second alpha olefin content of 9.8 to 64.8 mol %; c) diene content of 0.2 to 5 mol %; d) a branching index g'ave of 0.95 or more; e) an Mw/Mn of 4.0 or less; f) a melting point of 30° C. or less; g) a Composition Distribution Breadth Index of 50% or more; and h) a complex viscosity ratio (eta*(0.01 r/s)/eta*(100 rad/s), measured at 125° C.) greater than $1.1*Y_0$, where $Y_0=Y_1+\{[(Y_2-Y_1)/(X_2-X_1)](X_0-X_1)\}$, where $X_0$ is the wt % of $NCA_1$ used to prepare the polymer in question (based upon weight of $NCA_1$ and $NCA_2$), $X_1=0$, $X_2=100$, $Y_1=$complex viscosity ratio of polymer made with 100% $NCA_1$ and 0% $NCA_2$, $Y_2$ is complex viscosity ratio of polymer made with 100% $NCA_2$ and 0% $NCA_1$, $NCA_1$ is the noncoordinating anion having the lower Mw, and $NCA_2$ is the NCA having the higher Mw.

2. The copolymer of paragraph 1 wherein the first alpha olefin is ethylene and/or the second alpha olefin is propylene, and/or the diene is ethylidenenorbornene and/or vinyl norbornene, preferably the first alpha olefin is ethylene, the second alpha olefin is propylene, and the diene is ethylidenenorbornene.

3. The copolymer of paragraph 1, 2 or 3 wherein the copolymer has a Mooney Viscosity ((1+4) at 125° C.) of 60 to 80 MU.

4. The copolymer of paragraph 1, 2 or 3 wherein the copolymer has a g'(Zave) of 0.93 or more.

5. The copolymer of paragraph 1, 2, 3 or 4 wherein the copolymer has an Mooney large relaxation area of 170 MU*sec or more, preferably 180 MU*sec or more.

6. The copolymer of any of paragraphs 1 to 5 wherein the copolymer has a shear thinning index of less than –0.65.

7. The copolymer of any of paragraphs 1 to 6 wherein the copolymer has a complex viscosity ratio (measured at 0.01 rad/s and 100 rad/s) of 200 or more.

8. The copolymer of any of paragraphs 1 to 7 wherein a plot of the loss angle δ (degree) versus the measurement frequency ω (rad/s), the copolymers show a plateau between 30 and 80 rad/s.

9. A method to polymerize olefins to obtain the copolymer of any of paragraphs 1 to 8, comprising contacting a catalyst compound with at least two non-coordinating anion activators (NCA's), a first alpha olefin; a second alpha olefin, different from the first alpha olefin, and a diene to obtain a copolymer, where the catalyst compound is combined with the activators prior to introduction into the polymerization reaction and where the catalyst compound is represented by the formula (I) above: wherein M is a group 3, 4, 5 or 6 transition metal atom, a lanthanide metal atom, or an actinide metal atom, preferably Hf, Ti or Zr; Y is a Group 15 or 16 bridging heteroatom substituent that is bonded to E and A; and each X is, independently, a univalent anionic ligand, or both X are joined and bound to the metal atom to form a metallocycle ring, or both X join to form a chelating ligand, a diene ligand, or an alkylidene ligand; and either: 1) E is: a substituted or unsubstituted fluorenyl ligand that is bonded to Y through the one, two, three, four, five, six, seven or eight position of the fluorenyl ring and A is a substituted or unsubstituted cyclopentadienyl ligand, or 2) both E and A are substituted or unsubstituted indenyl ligands;

wherein the two non-coordinating anion activators are different, and are preferably chosen such that they produce polymers under the same conditions (except that the other activator is absent) having at least one order of magnitude difference in weight average molecular weight and the polymer having the lower Mw has an Mw of at least 10,000 g/mol.

10. The process of paragraph 9 wherein the catalyst is represented by formula (II) above and where: M is Hf, Ti and/or Zr; $R^1$, $R^2$, $R^3$, $R^4$, $R^5$, $R^6$, $R^7$, $R^8$, $R^{11}$, $R^{12}$, $R^{13}$ and $R^{14}$, are independently, hydrogen, or a hydrocarbyl, substituted hydrocarbyl, halogen, halocarbyl, substituted halocarbyl, silylcarbyl, substituted silylcarbyl, germylcarbyl, substituted germylcarbyl; Y is a bridging group containing a Group 13, 14, 15, or 16 element and is bonded to any single position of each ring structure, thereby replacing one of $R^{11}$, $R^{12}$, $R^{13}$ or $R^{14}$, and one of $R^1$, $R^2$, $R^3$, $R^4$, $R^5$, $R^6$, $R^7$, and $R^8$; and each X is a univalent anionic ligand, or two X are joined and bound to the metal atom to form a metallocycle ring, or two X are joined to form a chelating ligand, a diene ligand, or an alkylidene ligand.

11. The process of paragraph 9 wherein the catalyst is represented by formula (III) above and where $M^1$ is zirconium and/or hafnium;

$R^1$ and $R^2$ are identical or different and are selected from hydrogen atoms, C1-C10 alkyl groups, C1-C10 alkoxy groups, C6-C10 aryl groups, C6-C10 aryloxy groups, C2-C10 alkenyl groups, C2-C40 alkenyl groups, C7-C40 arylalkyl groups, C7-C40 alkylaryl groups, C8-C40 arylalkenyl groups, OH groups or halogen atoms; or conjugated dienes that are optionally substituted with one or more hydrocarbyl, tri(hydrocarbyl)silyl groups or hydrocarbyl tri(hydrocarbyl) silylhydrocarbyl groups;

$R^3$, $R^4$, $R^5$, $R^6$, $R^7$, $R^8$, $R^9$, $R^{10}$, $R^{11}$ and $R^{12}$ are the same or different and are selected from hydrogen atoms, halogen atoms, C1-C10 halogenated or unhalogenated alkyl groups, C6-C10 halogenated or unhalogenated aryl groups, C2-C10 halogenated or unhalogenated alkenyl groups, C7-C40 halogenated or unhalogenated arylalkyl groups, C7-C40 halogenated or unhalogenated alkylaryl groups, C8-C40 halogenated or unhalogenated arylalkenyl groups, —NR'$_2$, —SR', —OR', —OSiR'$_3$ or —PR'$_2$ radicals in which R' is one of a halogen atom, a C1-C10 alkyl group, or a C6-C10 aryl group; or two or more adjacent radicals $R^5$ to $R^7$ together with the atoms connecting them can form one or more rings (preferably $R^3$ is methyl, ethyl or butyl), and adjacent radicals $R^{11}$ and $R^{12}$ can form one or more saturated or aromatic rings;

$R^{13}$ is selected from:

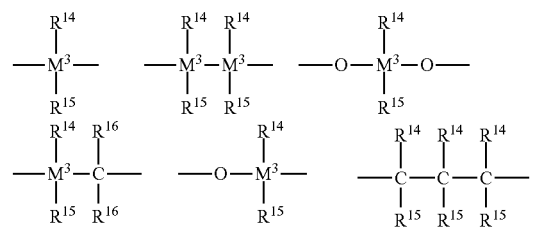

—B($R^{14}$)—, —Al($R^{14}$)—, —Ge—, —Sn—, —O—, —S—, —SO—, —SO$_2$—, —N($R^{14}$)—, —CO—, —P($R^{14}$)— —P(O)($R^{14}$)—, —B(N$R^{14}R^{15}$)— and —B[N(Si$R^{14}R^{15}R^{16}$)$_2$]—, $R^{14}$, $R^{15}$ and $R^{16}$ are each independently selected from hydrogen, halogen, C1-C20 alkyl groups, C6-C30 aryl groups, C1-C20 alkoxy groups, C2-C20 alkenyl groups, C7-C40 arylalkyl groups, C8-C40 arylalkenyl groups and C7-C40 alkylaryl groups, or $R^{14}$ and $R^{15}$, together with the atom(s) connecting them, form a ring; and $M^3$ is selected from carbon, silicon, germanium and tin, or $R^{13}$ is represented by the formula IV above: wherein $R^{17}$ to $R^{24}$ are, independently, hydrogen, or a hydrocarbyl, substituted hydrocarbyl, halogen, halocarbyl, substituted halocarbyl, silylcarbyl, substituted silylcarbyl, germylcarbyl, substituted germylcarbyl; or two or more adjacent radicals $R^{17}$ to $R^{24}$, including $R^{20}$ and $R^{21}$, together with the atoms connecting them form one or more rings; $M^2$ is carbon, silicon, germanium, or tin.

12. The process of paragraph 9 wherein catalyst is represented by the formula: $Y(Ind)_2MX_2$, or $Y(2\text{-alkyl*-4-Ph*} Ind)_2MX_2$, where: M is Hf, Ti and/or Zr; Y is a bridging group containing a Group 13, 14, 15, or 16 element; each X is a univalent anionic ligand, or two X are joined and bound to the metal atom to form a metallocycle ring, or two X are joined to form a chelating ligand, a diene ligand, or an alkylidene ligand; and each Ind is, independently, a substituted or unsubstituted indenyl compound; alkyl* is an alkyl group, Ph* is a substituted or unsubstituted phenyl group.

13. The process of paragraph 9, 10, 11 or 12 (or the copolymer of paragraph 1 to 8) wherein the two non-coordinating anion activators are chosen such that one is not a bulky activator and one is a bulky activator where a "bulky activator" is an anionic activator represented by the formula:

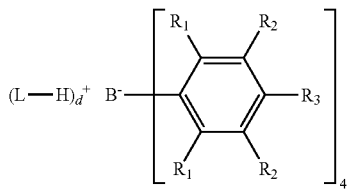

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); L is an neutral Lewis base; $(L\text{-}H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

14. The process of any of paragraphs 9 to 13 wherein the polymerization process is a solution process.

15. The process of any of paragraphs 9 to 14, wherein the polymerization occurs in a single reaction zone.

16. The process of any of paragraphs 9 to 15 wherein the catalyst compound is selected from the group consisting of: di(p-trimethylsilyl-phenyl)methylene (cyclopentadienyl) (2,7-di-tert-butyl-9-fluorenyl) hafnium dimethyl (or dichloride), dimethylsilyl-bis(2-methyl,4-phenyl-indenyl)zirconium dimethyl (or dichloride), dimethylsilyl-bis(2-methyl,4-(3',5'-di-t-butyl-phenyl)-indenyl)zirconium dimethyl (or dichloride), dimethylsilyl-bis(2-methyl,4-naphthyl-indenyl) zirconium dimethyl (or dichloride), and dimethylsilyl-bis(2-methyl,4-(3',5'-di-t-butyl-naphthyl)-indenyl)zirconium dimethyl (or dichloride).

17. The process of any of paragraphs 9 to 16 wherein the two NCA's are contacted separately with the catalyst prior to combination with the monomers.

18. The process of any of paragraphs 9 to 17 (or the copolymers of paragraphs 1-8) wherein activators are each represented by the formula:

$$(Z)_d^+(A^{d-})$$

wherein Z is (L-H) or a reducible Lewis Acid, L is an neutral Lewis base; H is hydrogen; $(L\text{-}H)^+$ is a Bronsted acid; $A^{d-}$ is a non-coordinating anion having the charge d−; and d is 1, 2 or 3.

19. The process of any of paragraphs 9 to 18 (or the copolymers of paragraphs 1-8) wherein at least one activator is represented by the formula:

$$(Z)_d^+(A^{d-})$$

wherein $A^{d-}$ is a non-coordinating anion having the charge d−; d is 1, 2, or 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

20. The process of any of paragraphs 9 to 19 (or the copolymers of paragraphs 1-8) wherein the activators are selected from the group consisting of:
N,N-dimethylanilinium tetrakis(pentafluorophenyl)borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium)tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium)tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium)tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium)tetrakis(perfluorobiphenyl)borate,
[4-t-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate, N,N-dimethylanilinium tetraphenylborate,
N,N-diethylanilinium tetraphenylborate,
N,N-dimethyl-(2,4,6-trimethylanilinium)tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium)tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium)tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium)tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium)tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium)tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

21. The process of any of paragraphs 9 to 20 (or the copolymers of paragraphs 1-8) wherein the two activators are N,N-dimethylanilinium tetrakis(pentafluorophenyl)borate and N,N-dimethylanilinium tetrakis(heptafluoronaphthyl)borate.

22. The process of any of paragraphs 9 to 21 wherein the process occurs at a temperature of from about 80° C. to about 150° C., at a pressure in the range of from 0.1 MPa to about 10 MPa, and at a time up to 300 minutes.

23. The process of any of paragraphs 9 to 22 (or the copolymers of paragraphs 1-8) wherein the diene is selected from the group consisting of: butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, vinylnorbornene, norbornadiene, ethylidene norbornene, divinylbenzene, dicyclopentadiene, and combinations thereof 24. The process of any of paragraphs 9 to 23 (or the copolymers of paragraphs 1-8) wherein the diene is selected from the group consisting of: 5-ethylidene-2-norbornene, 1,4-hexadiene, 1,6 octadiene, 5-methyl-1,4-hexadiene, 3,7-dimethyl-1,6-octadiene, dicyclopentadiene, norbornadiene, 5-vinyl-2-norbornene, and combinations thereof

EXPERIMENTAL

Test Methods

FTIR

Ethylene and propylene content were determined by FTIR, ASTM D3900, and were not corrected for diene content. Ethylidene norbornene (ENB) content was determined by FTIR, ASTM D6047.

Gel Permeation Chromatography (GPC-DRI)

Unless otherwise indicated, Mw, Mn, Mz and Mw/Mn are determined by using a High Temperature Gel Permeation Chromatography (Polymer Laboratories), equipped with a differential refractive index detector (DRI). Three Polymer Laboratories PLgel 10 µm Mixed-B columns are used. The nominal flow rate is 1.0 mL/min, and the nominal injection volume is 300 µL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1,2,4 trichlorobenzene (TCB). The TCB mixture is then filtered through a 0.1 µm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation.

$$\log M_X = \frac{\log(K_X/K_{PS})}{a_X+1} + \frac{a_{PS}+1}{a_X+1} \log M_{PS}$$

where the variables with subscript "X" stand for the test sample while those with subscript "PS" stand for polystyrene (PS). In this method, $a_{PS}=0.67$ and $K_{PS}=0.000175$ while $a_x$ and $K_x$ are obtained from published literature. For purposes of this invention, unless otherwise indicated, a=0.695 for ethylene polymers, a=0.705 for propylene polymers, a=0.699 for EPDM copolymers, K=0.000579 for ethylene polymers, K=0.0002288 for propylene polymers and K=0.000395 for EPDM copolymers.

The concentration, c, at each point in the chromatogram is calculated from the baseline-subtracted DRI signal, $I_{DRI}$, using the following equation:

$$c=K_{DRI}I_{DRI}/(dn/dc)$$

where $K_{DPI}$ is a constant determined by calibrating the DRI, and (dn/dc) is the refractive index increment for the system. For purposes of this invention, unless otherwise indicated, do/dc=0.104 for ethylene polymers 0.104 for propylene copolymers and 0.945 for EPDM copolymers.

The mass recovery is calculated from the ratio of the integrated area of the concentration chromatography over elution volume and the injection mass which is equal to the predetermined concentration multiplied by injection loop volume.

Size-Exclusion Chromatography (GPC-DRI-SEC-LS)

Branching index, g'ave, is determined using a commercial High Temperature Size Exclusion Chromatograph (e.g., from Waters Corporation or Polymer Laboratories) equipped with three in-line detectors: a differential refractive index detector (DRI), a light scattering (LS) detector, and a viscometer. The following approach is used for polyolefins. Details not described, including detector calibration, can be found in *Macromolecules* 34, 6812-6820 (2001).

Column set: 3 Polymer Laboratories PLgel 10 mm Mixed-B columns
Flow rate: 0.5 mL/min
Injection volume: 300 microliters
Solvent: 1,2,4-trichlorobenzene (TCB), containing 6 g of butylated hydroxy toluene dissolved in 4 liters of Aldrich reagent grade TCB
Temperature: 135° C.

The various transfer lines, columns, DRI detector and viscometer are contained in an oven maintained at 135° C. The TCB solvent is filtered through a 0.7 μm glass pre-filter and subsequently through a 0.1 μm Teflon filter, then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.284 g/mL at 145° C. Injection concentration ranges from 1.0 to 2.0 mg/mL, with lower concentrations being used for higher molecular weight samples. Prior to running a set of samples, the DRI detector and injector are purged, the flow rate increased to 0.5 ml/min, and the DRI allowed to stabilize for 8-9 hours; the LS laser is turned on 1 hr before running samples.

The concentration, c, at each point in the chromatogram is calculated from the baseline-subtracted DRI signal, $I_{DRI}$, using the following equation:

$$c=K_{DRI}I_{DRI}/(dn/dc)$$

where $K_{DRI}$ is a constant determined by calibrating the DRI, and (dn/dc) is the same as described below for the light scattering (LS) analysis. Units on parameters throughout this description are such that concentration is expressed in g/mL, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, unless otherwise indicated $A_2$=0.001 for EPDM copolymers], P(θ) is the form factor for a monodisperse random coil, and $K_o$ is the optical constant for the system:

$$K_o = \frac{4\pi^2 n^2 \left(\frac{dn}{dc}\right)^2}{\lambda^4 N_A}$$

where $N_A$ is Avogadro's number, and (dn/dc) is the refractive index increment for the system. The refractive index, n=1.500 for TCB at 145° C. and 2=657 nm. For purposes of this invention and the claims thereto (dn/dc)=0.104 for propylene polymers, 0.104 for ethylene polymers, 0.945 for EPDM copolymers and 0.1 otherwise.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s=c[\eta]+0.3(c[\eta])^2$$

where c is concentration and was determined from the DRI output.

The branching index (g')ave is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromotographic slices, i, between the integration limits. The branching index g', also referred to as g'ave, is defined as:

$$g' = \frac{[\eta]_{avg}}{kM_v^\alpha}$$

where, for purpose of this invention and claims thereto, $\alpha=0.695$ for ethylene polymers, $\alpha=0.705$ for propylene polymers, $\alpha=0.699$ for EPDM copolymers, $k=0.000579$ for ethylene polymers, $k=0.0002288$ for propylene polymers and $k=0.000395$ for EPDM copolymers, $M_v$ is the viscosity-average molecular weight based on molecular weights determined by LS analysis.

Z average branching index ($g'_{Zave}$) is calculated using Ci=polymer concentration in the slice i in the polymer peak times the mass of the slice squared, $Mi^2$.

All molecular weights are reported in g/mol unless otherwise noted.

Mooney viscosity is measured as ML (1+4) at 125° C. in Mooney units according to ASTM D-1646.

Mooney Large Relaxation Area (also referred to as Relaxation Area) is calculated as explained in ASTM D 1646, which is incorporated herein by reference. For example, MLRA is calculated according to the equation: MLRA= $[100^{(a+1)}-1]_x[(k)/(a+1)]$ in which "a" and "log(k)" are respectively the slope and intercept of the least squares regression line of log(Mooney torque) versus log(relaxation time) measured between 1 and 100 seconds relaxation time and using equipment built-in data sampling protocol. "k" and "a" are derived from the power law model fit to ML vs. time, with regression coefficients >0.997 in all cases.

EXAMPLES

All of the examples were run in a 1-liter, solution-phase continuous stirred tank reactor. The reactor temperature was controlled at 120° C. by metering a mixture of chilled water and steam to the reactor jacket, and reactor pressure was maintained near 320 psig (2206 kPa) by a back-pressure regulator on the effluent line downstream of the reactor. Raw materials (ethylene, propylene, isohexane, and toluene) were obtained from an integrated pipeline source. Isohexane and toluene were further purified by passing the material through a series of adsorbent columns containing either 3A mole or 13X mole sieves followed by treatment with alumina. Ethylene and propylene monomers were purified on-line by passing the feed streams through beds of 3A mole sieves. Diene monomers were purified by filtering through alumina prior to use.

Each of the monomer feeds was metered to a common mixing manifold by mass flow controllers (Brooks), and combined with isohexane solvent prior to entering the reactor. Separate feed ports within the reactor were used to introduce scavenger (tri-n-octyl aluminum in isohexane) and catalysts, which were metered to separate injection ports in the reactor by an HPLC pump (ISCO). Nominal reactor residence times were on the order of 10 minutes, after which the continuous reactor effluent was collected, stabilized with 1000 ppm IRGANOX™ 1076, and then dried in a vacuum oven at 80° C. for 12 hours to remove all residual solvent and monomers. The vacuum oven dried samples were then collected, weighed, and distributed for further chemical and physical characterization.

Figure 4:
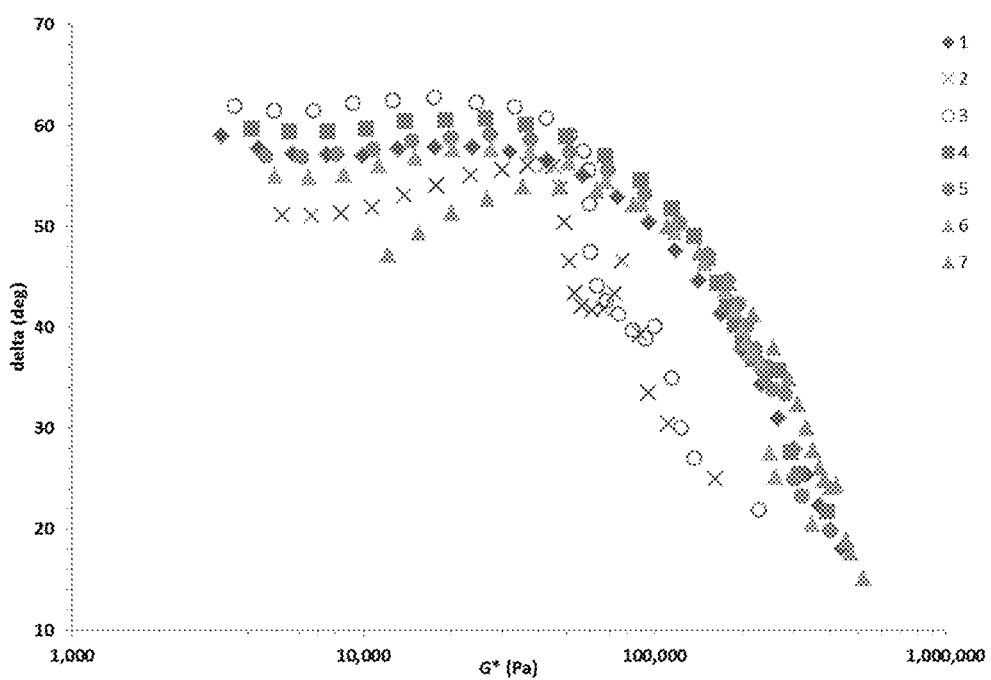
FIG. 4 is a graph of small-strain rheology spectra illustrating that Samples 2 and 3 show improved shear-thinning behavior corresponding to 20% $B(C_{10}F_7)_4$ in the feed.
Figure 5:
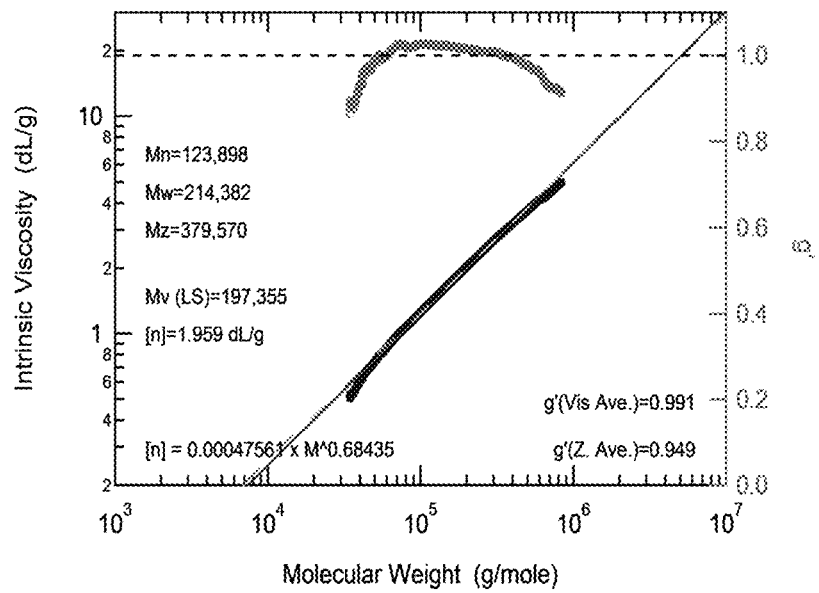
FIG. 5 is characterization data for the polymer produced in example 2.
Figure 5:
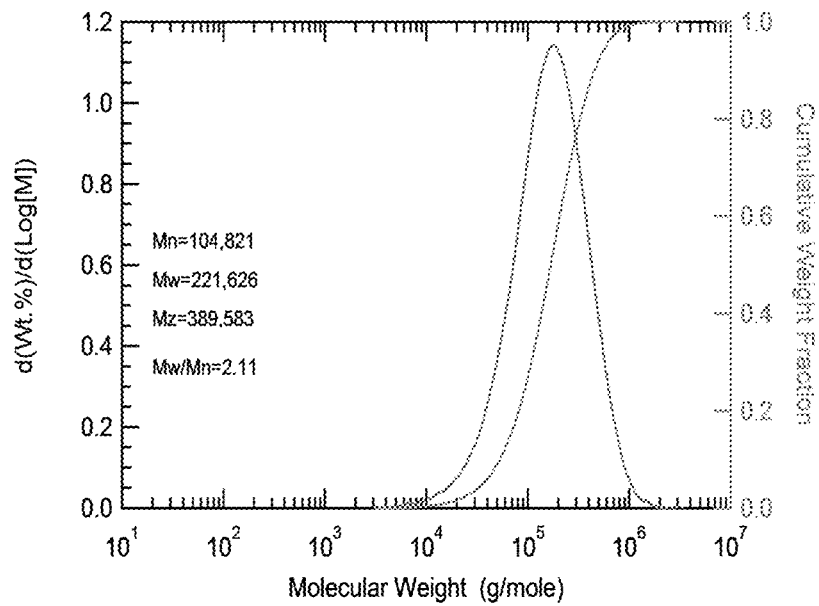
Figure 6:
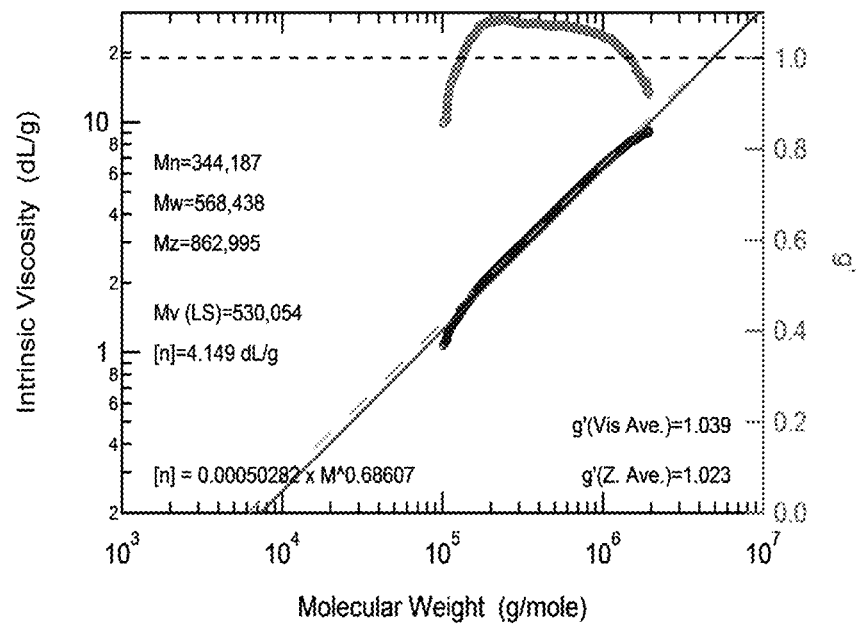
FIG. 6 is characterization data for the polymer produced in example 3.
Figure 6:
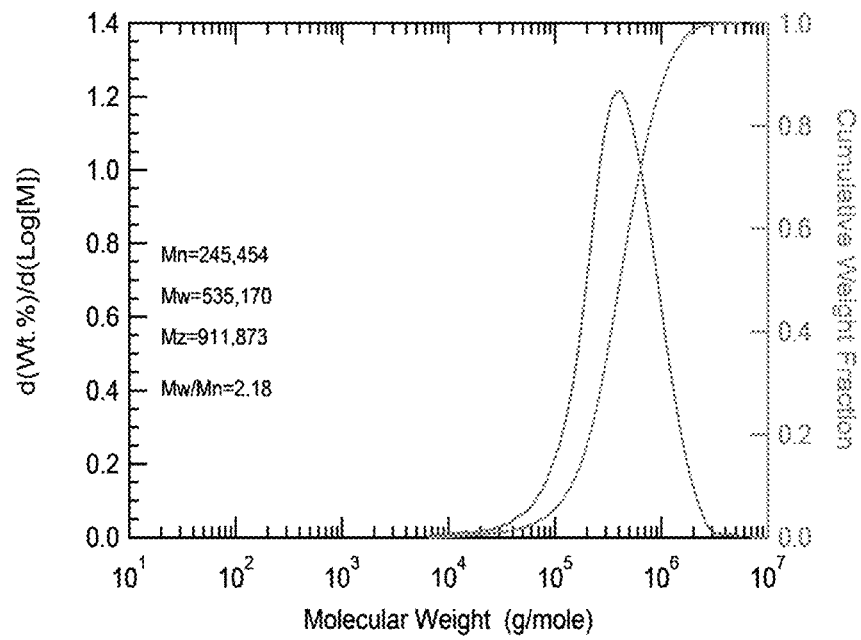

In the example below, two separate catalyst system feeds were used to provide the reactor with a tunable supply of multi-sited catalyst as a means of broadening the Mw/Mn of the polymer. Each of the catalyst solutions were prepared in toluene using the same catalyst precursor (di(p-trimethylsilyl-phenyl)methylene (cyclopentadienyl) (2,7-di-tert-butyl-9-fluorenyl) hafnium dimethyl) activated by either dimethylanilinium tetrakis(perfluorophenyl)borate (activator 1) or dimethylanilinium tetrakis(perfluoronaphthyl)borate (activator 2). The experimental design in Table 1 shows the continuum of catalyst feed ratios tested while holding all other process conditions constant. Individual catalyst feed rates were carefully chosen to maintain a consistent monomer concentration and conversion throughout the test space, ensuring that all polymers were made under the same process conditions and therefore their performance properties are directly comparable. Table 2 lists the composition, molecular weight, and Mooney viscosity analysis for each polymer. Note that polymers generated at 10-30% cat/act1 in the feed showed unique and improved rheological performance, evident in the MLRA characterization which is unusually enhanced over this particular range. The small-strain rheology shown in FIG. 4 supports this conclusion, as samples 2 and 3 showed distinct shear-thinning behavior.

TABLE 1

| Sample | $C_2^=$ Feed (g/min) | $C_3^=$ Feed (g/min) | ENB Feed (g/min) | cat/act1 Feed (mol/min) | cat/act2 Feed (mol/min) | Cat Feed Ratio (mol %) | Total Conversion (wt %) |
|---|---|---|---|---|---|---|---|
| 1 | 2.40 | 3.60 | 0.75 | 2.4E−07 | — | 0% | 43.0% |
| 2 | 2.40 | 3.60 | 0.75 | 1.5E−07 | 3.5E−08 | 20% | 40.8% |
| 3 | 2.40 | 3.60 | 0.75 | 1.5E−07 | 3.5E−08 | 20% | 39.3% |
| 4 | 2.40 | 3.60 | 0.75 | 1.3E−07 | 7.1E−08 | 36% | 43.7% |
| 5 | 2.40 | 3.60 | 0.75 | 1.1E−07 | 1.1E−07 | 50% | 40.8% |
| 6 | 2.40 | 3.60 | 0.75 | 8.6E−08 | 1.4E−07 | 62% | 41.5% |
| 7 | 2.40 | 3.60 | 0.75 | — | 2.12E−07 | 100% | 28.9% | cat = catalyst,
act1 = activator 1,
act2 = activator 2.

TABLE 2

| Sample | $C_2^=$ FTIR* (wt %) | $C_3^=$ FTIR* (wt %) | ENB FTIR (wt %) | Mw** (g/mol) | Mw/Mn | Mooney Viscosity (MU) | Mooney Large Relax. Area (MU * sec) | Rotor | Ratio of complex viscosity^ |
|---|---|---|---|---|---|---|---|---|---|
| 1 | 56.2 | 43.8 | 6.3 | 175480 | 2.18 | 53.3 | 134.4 | ML | 97.758 |
| 2 | 55.2 | 44.8 | 5.9 | 184233 | 2.35 | 66.59 | 191.6 | ML | 602.18 |
| 3 | 57.0 | 43.0 | 5.9 | 182420 | 1.96 | 73.44 | 208.6 | ML | 322.49 |
| 4 | 56.5 | 43.5 | 6.1 | 175616 | 2.19 | 69.8 | 174 | ML | 156.14 |
| 5 | 56.7 | 43.3 | 6.4 | 199463 | 1.97 | 73 | 190.8 | ML | 163.48 |
| 6 | 56.7 | 43.3 | 6.5 | 190565 | 2.05 | 74.2 | 224 | ML | 208.42 |
| 7 | 59.2 | 40.8 | 6.4 | 239008 | 2.1 | 28 | 294 | MST | 280.46 |

*(uncorrected),
ML = large rotor,
MST = small thin rotor,
^ = (eta * (0.01 r/s)/eta * (100 rad/s), measured at 125° C.,
**GPC-DRI All documents described herein are incorporated by reference herein, including any priority documents and/or testing procedures to the extent they are not inconsistent with this text. The term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

We claim:

1. A copolymer prepared using two or more non-coordinating anion activators said copolymer comprising a first alpha olefin, a second alpha olefin and diene, where the copolymer has:
   a) first alpha olefin content of 35 to 90 mol %;
   b) second alpha olefin content of 9.8 to 64.8 mol %;
   c) diene content of 0.2 to 5 mol %;
   d) a branching index $g'_{ave}$ of 0.95 or more;
   e) complex viscosity ratio (eta*(0.01 rad/s)/eta*(100 rad/s), at 125° C.) greater than $1.1*Y_0$, where $Y_0=Y_1+\{[Y_2-Y_1]/(X_2-X_1)](X_0-X_1)\}$, where $X_0$ is the wt % of a first non-coordinating anion activator, $NCA_1$, used to prepare the copolymer (based upon weight of $NCA_1$ and a second non-coordinating anion activator, $NCA_2$, used to prepare the copolymer), $X_1=0$, $X_2=100$, $Y_1=$complex viscosity ratio of polymer made with 100% $NCA_1$ and 0% $NCA_2$, $Y_2$ is complex viscosity ratio of polymer made with 100% $NCA_2$ and 0% $NCA_1$, where $NCA_1$ has an Mw lower than the Mw of $NCA_2$;
   f) an Mw/Mn of 5.0 or less;
   g) a melting point of 30° C. or less; and
   h) a Composition Distribution Breadth Index of 50% or more;
   wherein the $NCA_1$ and $NCA_2$ are part of a catalyst system that includes a metallocene catalyst, wherein each $NCA_1$ and $NCA_2$ are selected from compounds represented by the formula:

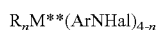
   $R_nM^{}(ArNHal)_{4-n}$ where R is a monoanionic ligand; $M^{}$ is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3; and the metallocene is represented by the formula:

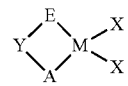

wherein: M is a group 3, 4, 5 or 6 transition metal atom, a lanthanide metal atom, or an actinide metal atom;
   E is a substituted or unsubstituted indenyl ligand or a substituted or unsubstituted fluorenyl ligand;
   A is a substituted or unsubstituted indenyl ligand or a substituted or unsubstituted cyclopentadienyl ligand, provided that when E is a substituted or unsubstituted indenyl ligand, then A is also a substituted or unsubstituted indenyl ligand;
   Y is a Group 15 or 16 bridging heteroatom containing substituent that is bonded to E and A; and
   each X is, independently, a univalent anionic ligand, or both X are joined and bound to the metal atom to form a metallocycle ring, or both X join to form a chelating ligand, a diene ligand, or an alkylidene ligand.

2. The copolymer of claim 1 wherein the first alpha olefin is ethylene, the second alpha olefin is propylene, and the diene is ethylidenenorbornene and/or vinyl norbornene.

3. The copolymer of claim 1 wherein the copolymer has a Mooney large relaxation area of 170 MU*sec or more and a Mooney Viscosity ((1+4) at 125° C.) of 60 to 80 MU.

4. The copolymer of claim 1 wherein the copolymer has a complex viscosity ratio (eta*(0.01 rad/s)/eta*(100 rad/s), at 125° C.) greater than $2*Y_0$.

5. The copolymer of claim 1 wherein the copolymer has a $g'_{avg}$ of 0.93 or more.

6. The copolymer of claim 1 wherein the copolymer has a Mooney large relaxation area of 170 MU*sec or more.

7. The copolymer of claim 1 wherein the copolymer has a shear thinning index of less than −0.65.

8. The copolymer of claim 1 wherein the copolymer has a complex viscosity ratio (measured at 0.01 rad/s and 100 rad/s) of 200 or more.

9. The copolymer of claim 1 wherein a plot of the loss angle δ (degree) versus the measurement frequency ω (rad/s), the copolymer shows a plateau between 30 and 80 rad/s.

* * * * *